US008986404B2

(12) United States Patent
Rosenzweig et al.

(10) Patent No.: US 8,986,404 B2
(45) Date of Patent: Mar. 24, 2015

(54) GAS GENERATOR WITH STARTER MECHANISM AND CATALYST SHIELD

(75) Inventors: Alain Rosenzweig, Saint Maur des Fosses (FR); Andrew J. Curello, Hamden, CT (US); Constance R. Stepan, Oxford, CT (US); Michael Curello, Cheshire, CT (US); Paul Spahr, New Haven, CT (US)

(73) Assignees: Societe BIC, Clichy Cedex (FR); The Commissariat a l'energie Atomique et aux Energies Alternatives (CEA), Gif-sur-Yvette Cedex (FR)

( * ) Notice: Subject to any disclaimer, the term of this patent is extended or adjusted under 35 U.S.C. 154(b) by 1065 days.

(21) Appl. No.: 12/829,801

(22) Filed: Jul. 2, 2010

(65) Prior Publication Data
US 2011/0099904 A1 May 5, 2011

Related U.S. Application Data

(63) Continuation-in-part of application No. PCT/US2009/063108, filed on Nov. 3, 2009, and a continuation-in-part of application No. 29/359,037, filed on Apr. 5, 2010, now Pat. No. Des. 673,497.

(51) Int. Cl.
*B01J 7/00* (2006.01)
*H01M 8/06* (2006.01)
*C01B 3/06* (2006.01)
*C01B 3/50* (2006.01)

(52) U.S. Cl.
CPC .............. *H01M 8/065* (2013.01); *C01B 3/065* (2013.01); *C01B 3/501* (2013.01); *C01B 2203/0405* (2013.01); *Y02E 60/50* (2013.01); *Y02E 60/362* (2013.01)
USPC ............... 48/61; 48/127.9; 48/127.1; 48/62 R

(58) Field of Classification Search
USPC .............. 48/76, 127.9, 62 R, 128, 198.2, 61, 48/197 R
See application file for complete search history.

(56) References Cited

U.S. PATENT DOCUMENTS 150,995 A 5/1874 Zwietusch
3,453,086 A 7/1969 Harm
(Continued)

OTHER PUBLICATIONS

International Search Report issued in connection with the corresponding International Application No. PCT/US2011/041234 on Nov. 17, 2011.
(Continued)

*Primary Examiner* — Kaity Handal
(74) *Attorney, Agent, or Firm* — The H.T. Than Law Group

(57) ABSTRACT

The present application is directed to gas generators comprising a fuel mixture and a catalyst. The catalyst is contained in a self-regulated reactor or buoy, and selectively opens and closes to produce a gas in accordance with the demand for gas. This fuel mixture is generally a solution formed by dissolving a solid fuel component in a liquid fuel component. The mixing preferably occurs before the first use, and more preferably occurs immediately prior to the first use. The inventive gas generators preferably further comprises a starting mechanism that isolates the solid fuel from the liquid fuel or vice versa before the first use. In one embodiment, the starting mechanism further comprises a catalyst shield mechanism that isolates the catalyst in the reactor or buoy from the liquid and/or the solid fuel prior to the first use.

19 Claims, 25 Drawing Sheets

(56) References Cited

U.S. PATENT DOCUMENTS

| | | |
|---|---|---|
| 3,459,510 A | 8/1969 | Litz |
| 3,594,232 A | 7/1971 | Spahrbier |
| 4,055,632 A | 10/1977 | Hoffman et al. |
| 6,534,033 B1 | 3/2003 | Amendola |
| 6,544,400 B2 | 4/2003 | Hockaday et al. |
| 6,939,529 B2 | 9/2005 | Strizki |
| 7,074,509 B2 | 7/2006 | Rosenfeld |
| 7,481,858 B2 | 1/2009 | Rosenzweig et al. |
| 2004/0047801 A1 | 3/2004 | Petillo et al. |
| 2005/0158595 A1 | 7/2005 | Marsh et al. |
| 2006/0185242 A1 | 8/2006 | Cha et al. |
| 2006/0191199 A1* | 8/2006 | Rosenzweig et al. ............. 48/61 |
| 2010/0104481 A1 | 4/2010 | Curello et al. |
| 2011/0212374 A1 | 9/2011 | Rosenzweig et al. |

OTHER PUBLICATIONS

Extended European Search Report issued in connection with the corresponding European Patent Application No. 11801332.5 on Jun. 24, 2014.

* cited by examiner

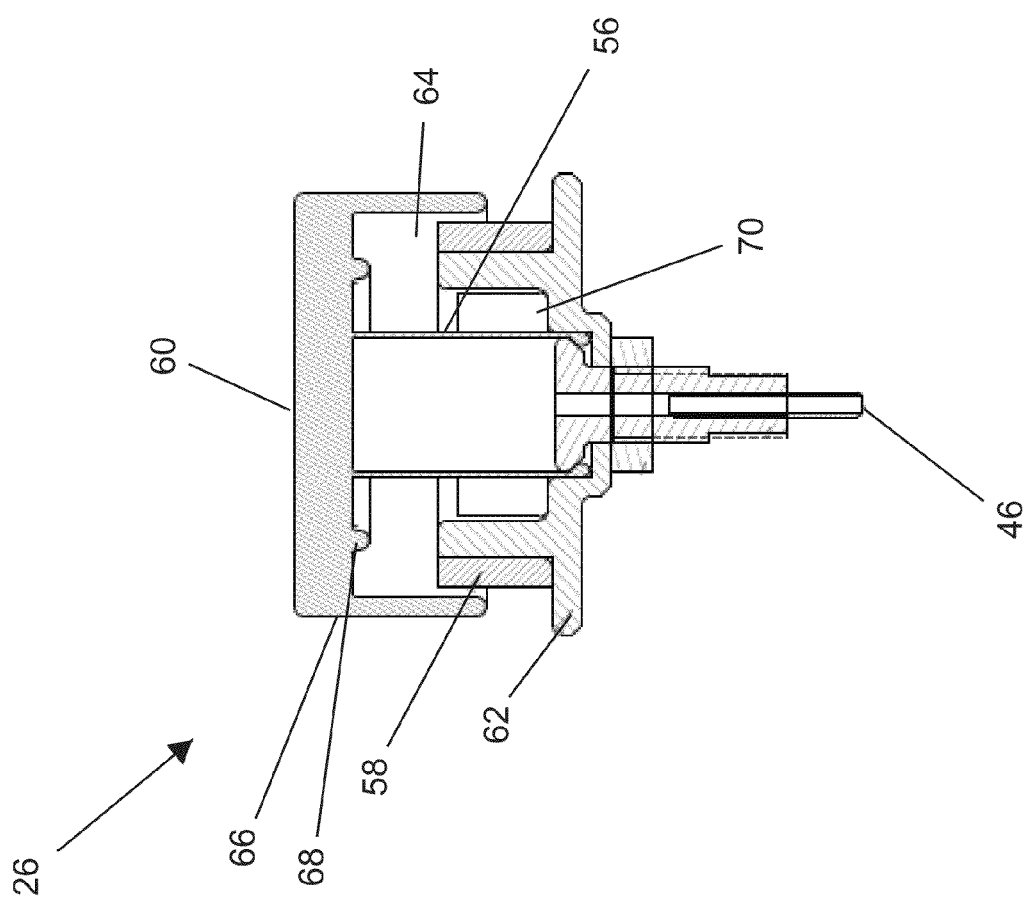

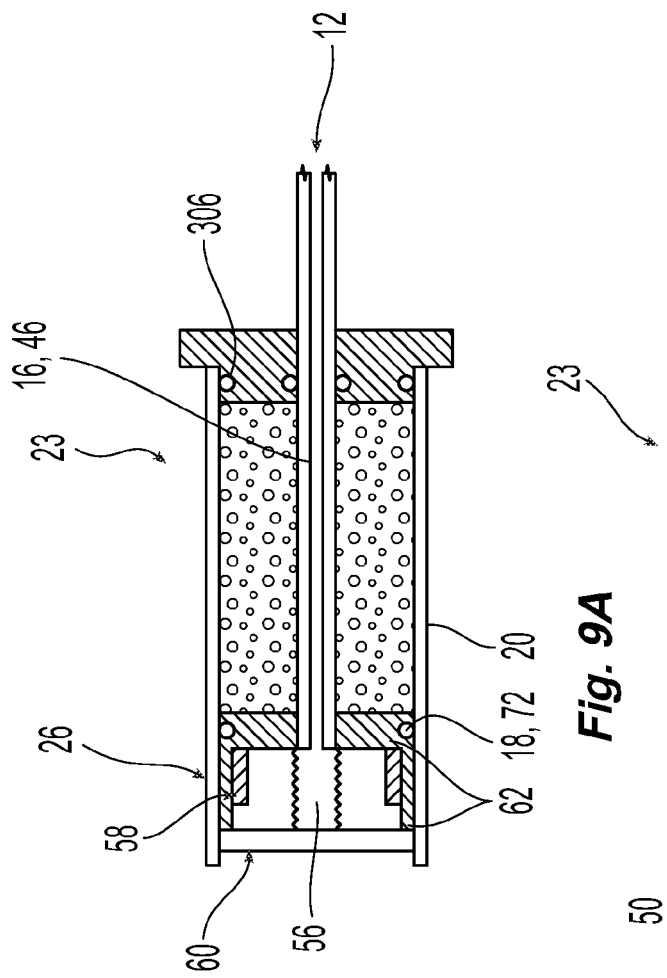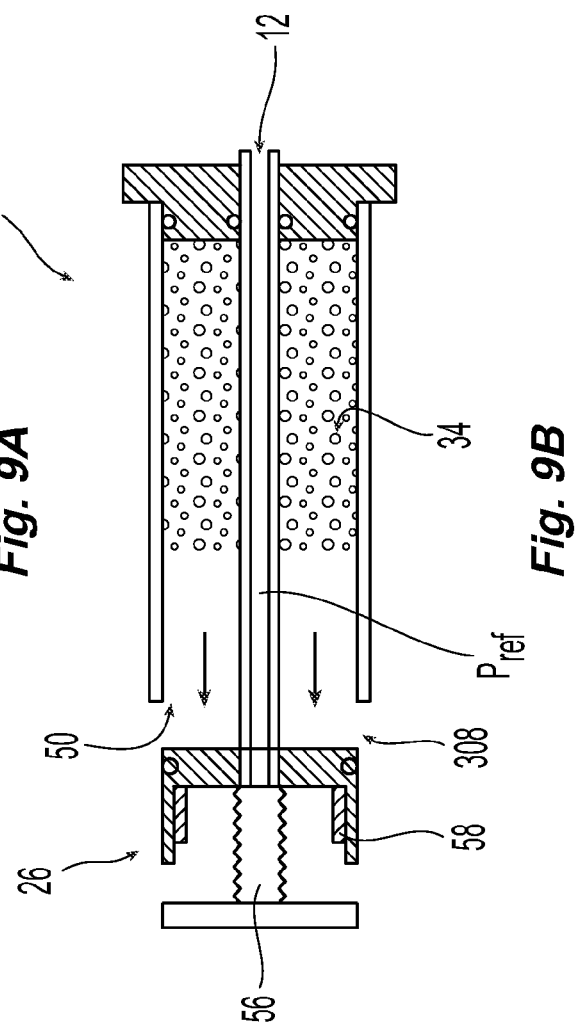
Fig. 9A
Fig. 9B

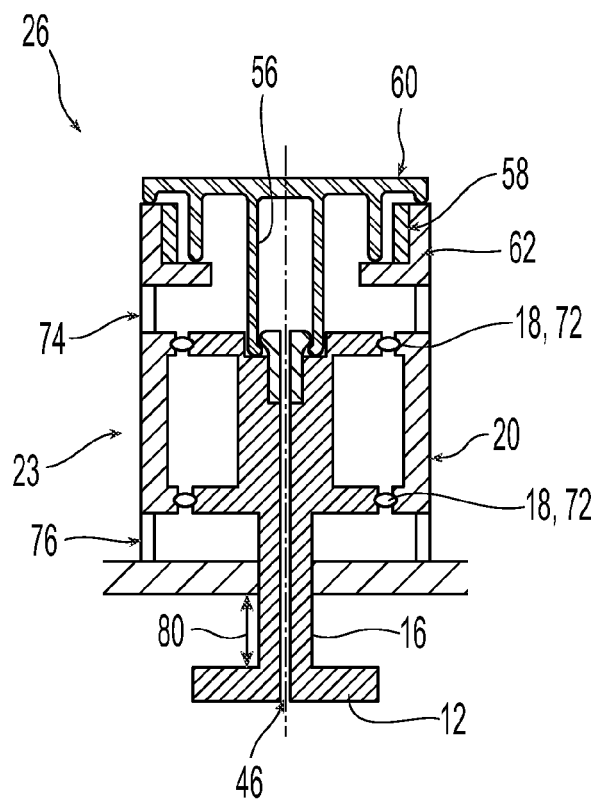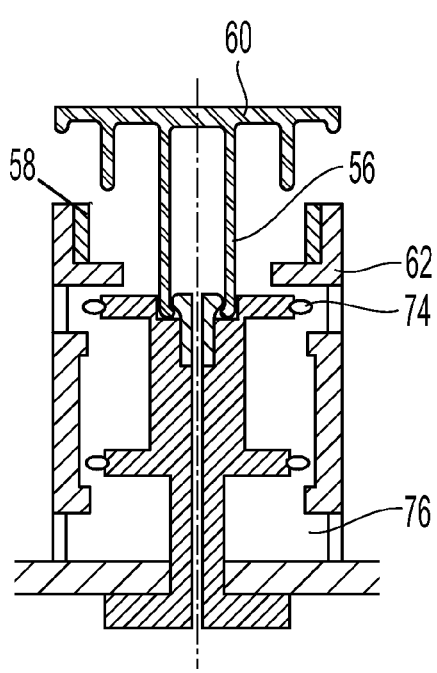
*Fig. 9C*  *Fig. 9D*

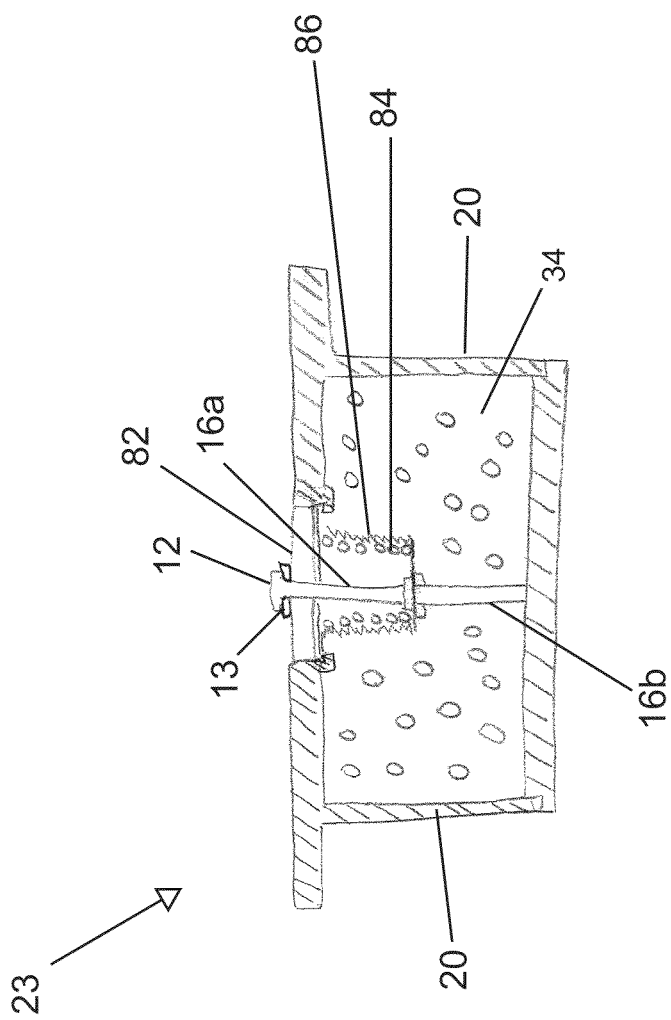

GAS GENERATOR WITH STARTER MECHANISM AND CATALYST SHIELD

CROSS REFERENCE TO RELATED PATENT APPLICATIONS

The present patent application is a continuation-in-part of international patent application serial no. PCT/US2009/063108 filed on 3 Nov. 2009 designating the United States. The present patent application is also a continuation-in-part of U.S. design patent application No. 29/359,037 filed on 5 Apr. 2010. These applications are incorporated herein by reference in their entireties.

FIELD OF THE INVENTION

The invention relates generally to fuel supplies for fuel cells. In particular, the invention relates to gas generators and more specifically hydrogen generators for use with fuel cells having improved reactors and starter mechanisms.

BACKGROUND OF THE INVENTION

Fuel cells are devices that directly convert chemical energy of reactants, i.e., fuel and oxidant, into direct current (DC) electricity. A common fuel for fuel cells is hydrogen gas, which can be stored in compressed form or stored in a hydrogen absorbent material, e.g., lanthanum nickel alloy, $LaNi_5H_6$, or other hydrogen absorbent metal hydrides. Hydrogen can also be produced on demand by chemical reaction between a chemical metal hydride, such as sodium borohydride, $NaBH_4$, and water or methanol.

In a chemical metal hydride reaction, a metal hydride such as $NaBH_4$, reacts as follows to produce hydrogen:

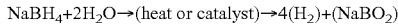

Half-reaction at the anode:

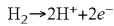

Half-reaction at the cathode:

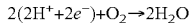

Suitable catalysts for this reaction include cobalt, platinum and ruthenium, and other metals. The hydrogen fuel produced from reforming sodium borohydride is reacted in the fuel cell with an oxidant, such as $O_2$, to create electricity (or a flow of electrons) and water by-product. Sodium borate ($NaBO_2$) by-product is also produced by the reforming process. A sodium borohydride fuel cell is discussed in U.S. Pat. No. 4,261,956, which is incorporated by reference herein in its entirety. The hydrogen produced by chemical metal hydrides may be compressed or stored in a metal hydride hydrogen absorbent material for later consumption by a fuel cell.

Disadvantages of known hydrogen gas generators using chemical hydride as fuel include storage and starting mechanisms. Over time, the stored fuel may degrade and the catalysts may lose their effectiveness, among other things. Accordingly, there is a need a hydrogen gas generator apparatus with improved storage and starting capabilities.

SUMMARY OF THE INVENTION

The present invention is directed toward fuel system/gas-generating apparatus that have significantly longer shelf life and can more efficiently produce hydrogen. The gas generating apparatus generates hydrogen and transfer the hydrogen to a fuel cell or another hydrogen consumer.

In one embodiment, the present invention is a gas-generating apparatus comprising a first compartment containing a first fuel and a second compartment containing a second fuel, wherein the first and second fuel are mixed to form a fuel mixture, said fuel mixture reacts to produce a gas in the presence of a catalyst. The first compartment comprises a cover connected to an actuator located on the outside of the gas-generating apparatus, wherein the actuator is selectively actuatable to mix the first and second fuels.

The cover and the actuator can be connected by a rigid or flexible connector to the actuator, and the connector can be hollow, and movable relative to the housing of the gas-generating apparatus. The gas-generating apparatus also has a self-regulating reactor or buoy containing the catalyst. The inventive gas-generating apparatus may also have a catalyst shield that is removed prior to a first use.

It is to be understood that both the foregoing general description and the following detailed description are exemplary and explanatory only, and are intended to provide a further explanation of the present invention, as claimed.

BRIEF DESCRIPTION OF THE DRAWINGS

In the accompanying drawings, which form a part of the specification and are to be read in conjunction therewith:

FIGS. 8B-8I illustrate alternative buoys;

FIGS. 9A-D are cross-sectional views of combined starter and buoy devices;

FIGS. 10A-C are cross-sectional views of spring-loaded starter mechanisms;

FIGS. 15A-C illustrate another alternative starter mechanism that shields the catalyst during storage; wherein FIG. 15A is an exploded view of this embodiment and FIGS. 15B-C are cross-sectional views along a major axis and minor axis, respectively, of the elliptical shaped starter mechanism; and FIGS. 16A-E illustrate yet another starter mechanism that shields the catalyst during storage; wherein FIG. 16A is an ex exploded view of this embodiment; FIGS. 16B-C are perspective views of the assembled mechanism in the open and closed position, respectively; and FIGS. 16D-E are cross-sectional views of the assembled mechanism in the open and closed position, respectively.

DETAILED DESCRIPTION OF THE INVENTION

Figure 1:
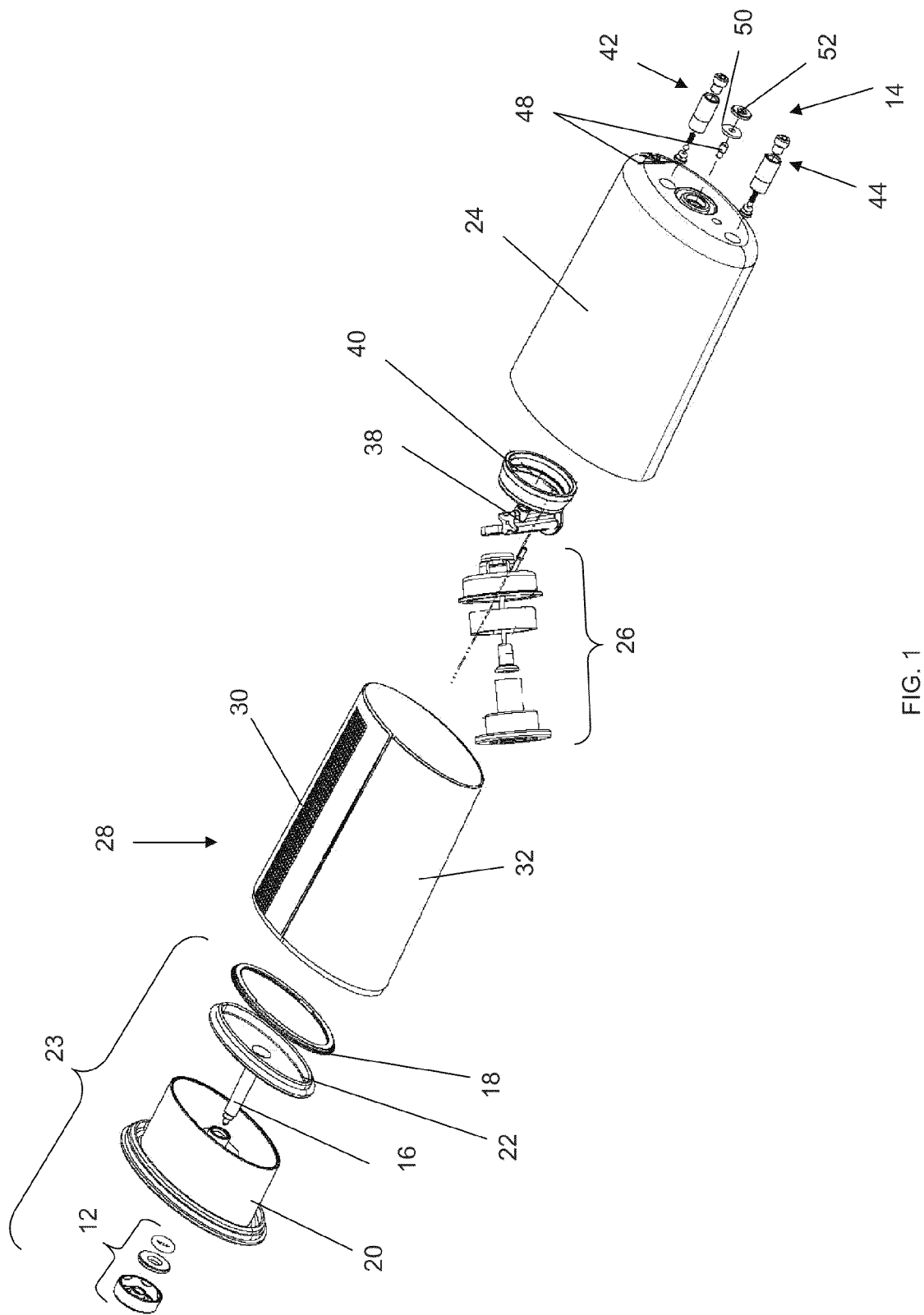
FIG. 1 is an exploded view of one embodiment of the inventive hydrogen-generating apparatus.

As illustrated in the accompanying drawings and discussed in detail below, the present invention is directed to gas generator which produces a gas such as hydrogen for use in fuel cells. The inventive gas generators have improved reactors or buoys and starter mechanisms, and improved shelf life.

The inventive gas generators comprise a fuel mixture and a catalyst. The catalyst is contained in a self-regulated reactor or buoy, and selectively opens and closes to produce a gas in accordance with the demand for gas. This fuel mixture is generally a solution formed by dissolving a solid fuel component in a liquid fuel component. The mixing preferably occurs before the first use, and more preferably occurs immediately prior to the first use.

The inventive gas generators preferably further comprises a starting mechanism that isolates the solid fuel from the liquid fuel or vice versa before the first use. In one embodiment, the starting mechanism further comprises a catalyst shield that isolates the catalyst in the reactor or buoy from the liquid and/or the solid fuel prior to the first use.

The term "solid fuel" as used herein includes all solid fuels that can be reacted to produce hydrogen gas, and includes, but is not limited to, all of the suitable chemical hydrides described herein and in WO2010-051557 A1, including lithium hydride, lithium borohydride, sodium hydride, potassium hydride, potassium borohydride, lithium aluminum hydride, combinations, salts, and derivatives thereof. WO2010-051557 A1 is incorporated herein by reference in its entirety. Preferably the solid fuel component is a chemical metal hydride such as sodium borohydride. The solid fuel component may include other chemicals, such as solubility-enhancing chemicals or stabilizers, such as soluble metal hydroxides, and preferably includes sodium hydroxide. Other usable stabilizers include potassium hydroxide or lithium hydroxide, among others.

The term "liquid fuel" as used herein includes all liquid fuels that can be reacted to produce hydrogen gas, and includes, but is not limited to, suitable fuels described herein and in WO2010-051557 A1, including water, alcohols and additives, catalysts, and mixtures thereof. Preferably, the liquid fuel, such as water or methanol, reacts with the solid fuel in the presence of catalyst to produce hydrogen. The liquid fuel may also include additives, stabilizers, or other reaction enhancers, such as sodium hydroxide as a stabilizer, a polyglycol as a surfactant, or many others.

Gels, suspended solids, emulsions that can react with either liquid or solid fuels to produce gas can be classified as a solid or liquid fuel in according with the present invention.

The catalyst may be platinum, ruthenium, nickel, cobalt, and other metals including those disclosed in WO2010-051557 A1 and derivatives thereof. The preferred catalysts include cobalt chloride or ruthenium chloride, or both. Another preferred catalyst is a compound containing cobalt and boron. In the presence of the catalyst, the fuel mixture reacts to produce hydrogen. A preferred catalyst system is discussed in Published International Patent Application No. WO 2010/075410, which is incorporated by reference in its entirety.

As used herein, the term "fuel supply" includes, but is not limited to, disposable cartridges, refillable/reusable cartridges, containers, cartridges that reside inside the electronic device, removable cartridges, cartridges that are outside of the electronic device, fuel tanks, fuel refilling tanks, other containers that store fuel and the tubings connected to the fuel tanks and containers. While a cartridge is described below in conjunction with the exemplary embodiments of the present invention, it is noted that these embodiments are also applicable to other fuel supplies and the present invention is not limited to any particular type of fuel supply.

The fuel supply used with the membrane assembly of the present invention can also be used to produce fuels that are not used in fuel cells. These applications can include, but are not limited to, producing hydrogen for micro gas-turbine engines built on silicon chips, discussed in "Here Come the Microengines," published in The Industrial Physicist (December 2001/January 2002) at pp. 20-25. As used in the present application, the term "fuel cell" can also include microengines.

Suitable known hydrogen-generating apparatus are disclosed in commonly-owned, U.S. Pat. Nos. 7,674,540 and 7,481,858, U.S. Patent Application Publication No. US2006-0174952 A1, international publication no. WO2010-051557 A1 and international publication no. WO 2010/075410 with which the inventive gas generators may be incorporated. The disclosures of these references are incorporated by reference herein in their entireties.

Figure 4:
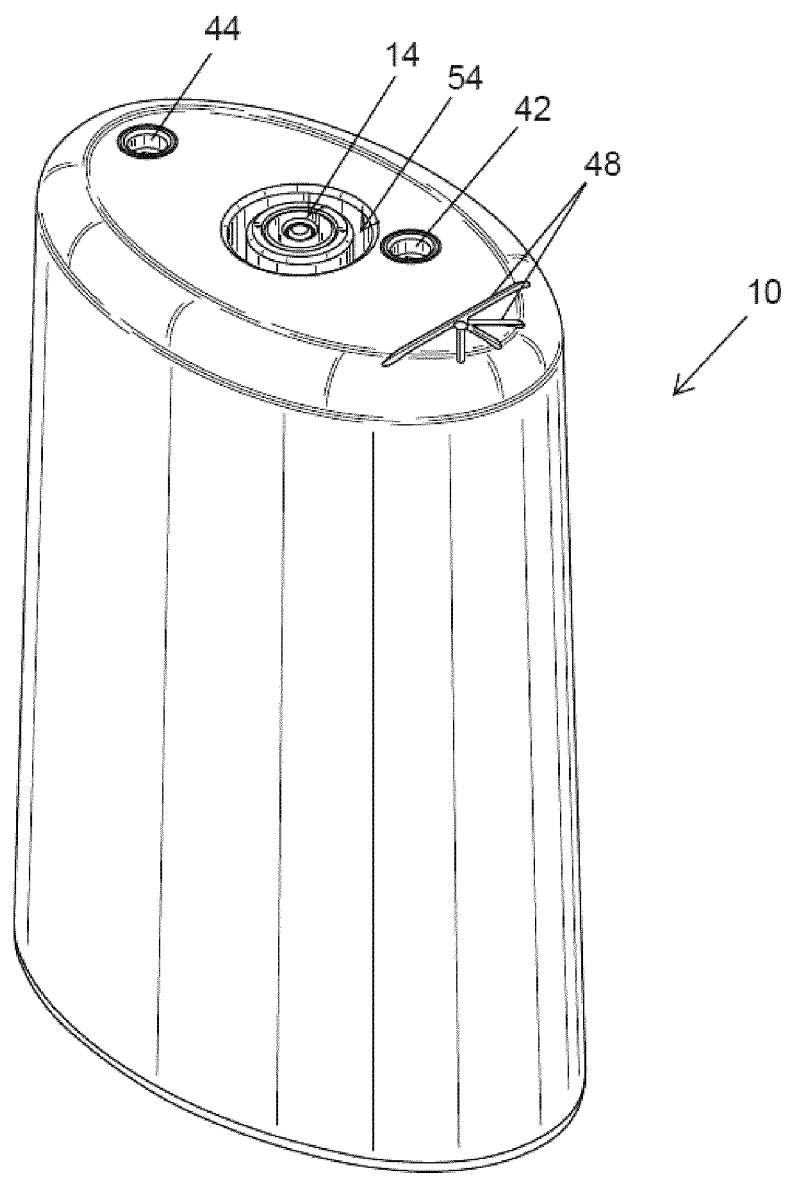
FIG. 4 is a perspective view of the assembled apparatus shown in FIG. 1.
Figure 5:
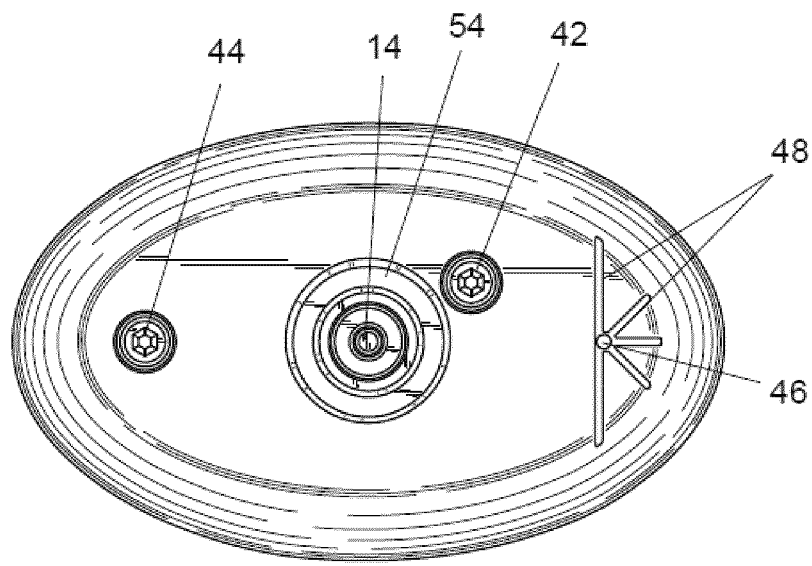
FIGS. 5 and 6 are top and bottom views, respectively, of the cartridge shown in FIG. 4.
Figure 6:
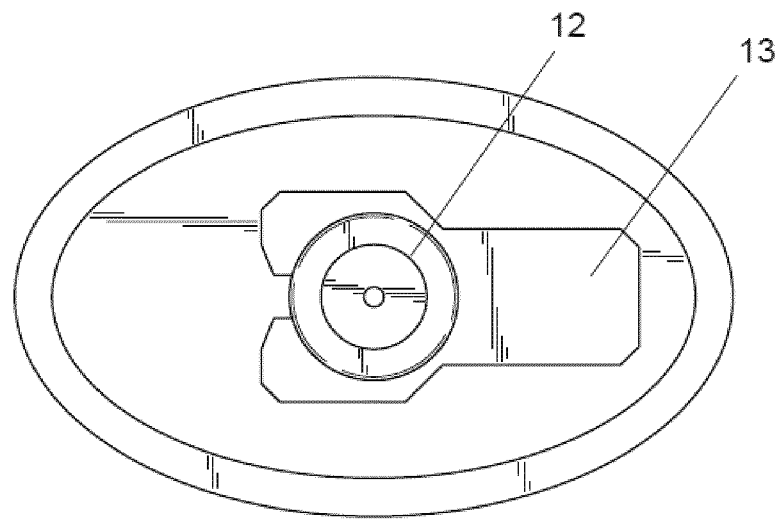
Figure 7:
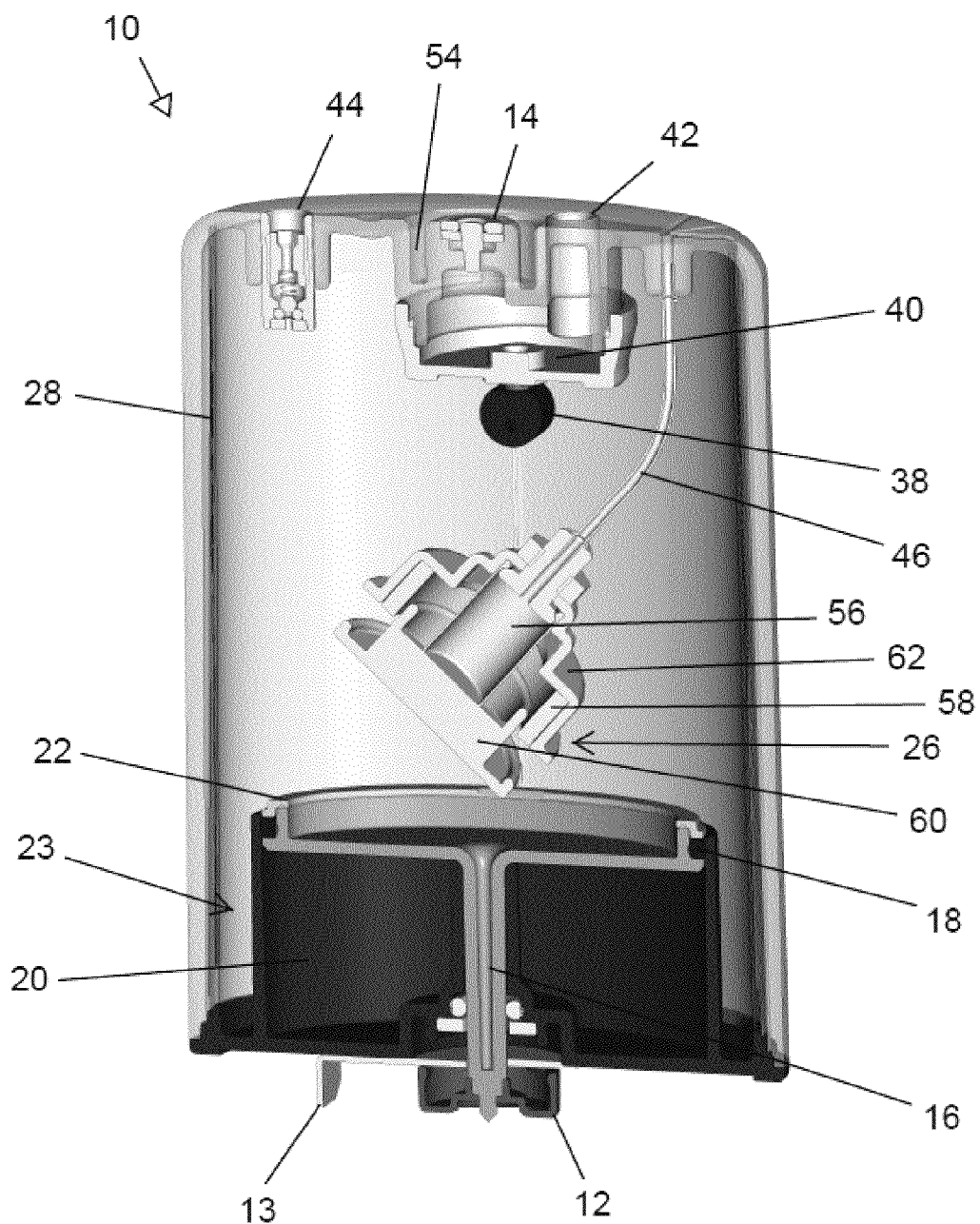
FIG. 7 is a full cross-sectional view of FIG. 3 in an inverted position to illustrate the starter mechanism.

FIGS. 1-7 illustrate a representative gas-generating apparatus, hereinafter referred to as hydrogen-generating apparatus 10, in accordance with the present invention. Hydrogen generating apparatus 10, as illustrated, is operated by pushing lock knob 12 inwards or towards outlet valve 14, which is located on the opposite end of hydrogen generator 10. As shown, lock knob 12 is attached, to seal piston 16, which moves the seal 18 towards an open position when lock knob 12 is depressed. This releases the solid fuel contained within the chamber 20 inside cover 22 of seal piston 16 to mix with the liquid fuel stored in main chamber 24. As best shown in FIG. 6, pull-tab 13 is provided to restrict the movement of lock knob 12 until the user pulls and removes optional pull-tab 13 from apparatus 10. The solid fuel then dissolves within liquid fuel present within the interior of container 24 to form an aqueous fuel mixture, discussed above. Lock knob 12, pull-tab 13, seal piston 16, seal 18, chamber 20 and cover 22 of seal piston 16 in this embodiment form starter mechanism 23, as best shown in FIG. 7. As best shown in FIG. 1, lock knob 12 includes a seal, such as a washer or O-ring, and a retainer to prevent liquid from exiting through the lock knob. Other embodiments of starter mechanisms 23 are described further below.

This aqueous fuel mixture contacts a catalyst stored within reactor buoy 26 and reacts to produce a gas such as hydrogen. Other fuel mixtures react with catalyst(s) to produce other gases, such as oxygen, ammonia, etc. As described in detail in WO2010-051557 A1, reactor buoy 26 opens and closes depending on a pressure difference or differential between the internal pressure of hydrogen generator 10 and a reference pressure to control the aqueous fuel mixture's access to the catalyst to control the production of hydrogen. Various embodiments of buoy 26 and improvements thereof are described below. The produced hydrogen gas permeates into membrane assembly 28 and is transported out of hydrogen generator 10, discussed below.

Figure 2:
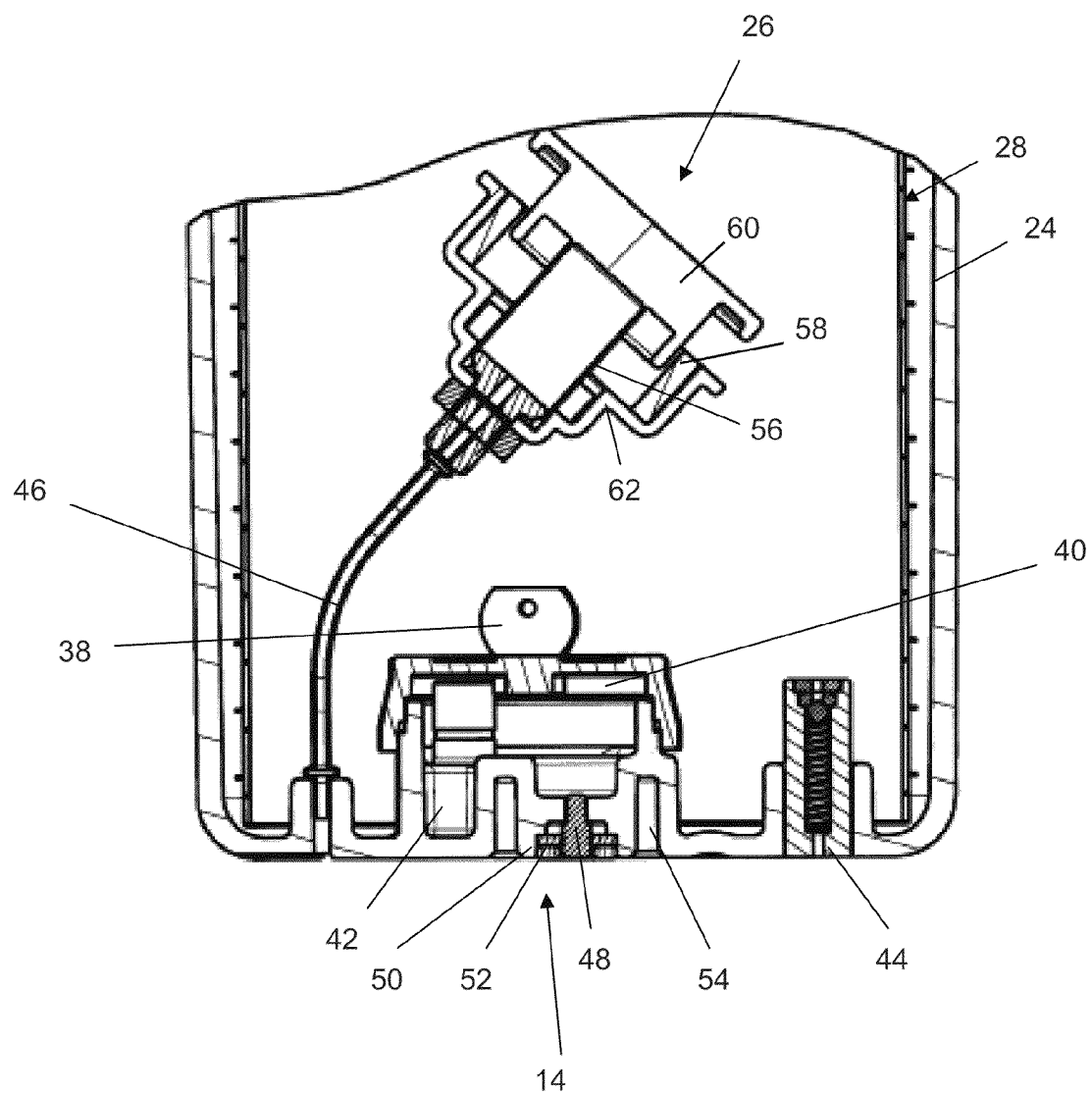
FIG. 2 is a partial cross-sectional view of the inventive hydrogen-generating apparatus depicted in FIG. 1.
Figure 3:
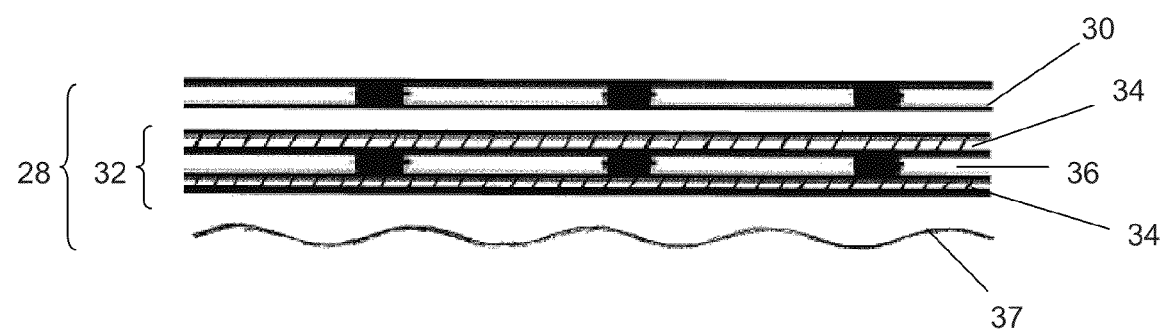
FIG. 3 is a partial cross sectional view of an inventive hydrophobic hydrogen output composite shown in FIG. 1.

As best illustrated in FIGS. 1-3, membrane assembly 28 comprises outer lattice 30 and hydrogen output composite 32. For clarity, outer lattice 30 is shown only partially in FIG. 1. Preferably, outer lattice 30 wraps all around hydrogen output composite 32. Hydrogen outlet composite 32 comprises in this preferred embodiment two layers of hydrogen permeable membranes 34 positioned on either sides of internal lattice 36. Hydrogen permeable membranes allow hydrogen to pass through but substantially exclude liquids. Suitable hydrogen permeable membranes include any substantially liquid-impermeable, gas-permeable material known to one skilled in the art. Such materials can include, but are not limited to, hydrophobic materials having an alkane group. More specific examples include, but are not limited to: polyethylene compositions, polytetrafluoroethylene, polypropylene, polyglactin (VICRY®), lyophilized dura mater, or combinations thereof. Commercially available suitable hydrogen permeable membranes include GORE-TEX®, CELGARD® and SURBENT® polyvinylidene fluoride (PVDF). Additionally, or alternatively, the hydrogen permeable membrane may include any of the gas-permeable substantially liquid-impermeable materials disclosed in U.S. Pat. No. 7,147,955, incorporated herein by reference.

Hydrogen permeable membranes 34 are preferably sealed together around internal lattice 36 to form the multilayer hydrogen output composite 32. Internal lattice 36 minimizes the possibility that the two hydrogen permeable membranes 34 would contact each other or seal together to minimize the flow of hydrogen. Outer lattice 30 is used to minimize contact between hydrogen output composite 32 and container 24, which could reduce the flow rate of hydrogen into hydrogen output composite 32. Outer lattice 30 and internal lattice 36 are preferably flexible. In a preferred embodiment, multilayer hydrogen output composite 32 is constructed as a flat structure, as best shown in FIG. 3, with hydrogen conduit 38 attached to one side of hydrogen output composite 32. A coarse filter 37, such as a corrugated paper or nonwoven can be placed on top of the flat structure to minimize the contact between hydrogen output composite 32 and any solids that may precipitate from the aqueous fuel mixture. The entire flat structure can simply be rolled up and inserted into container 24. Hydrogen conduit 38 is in fluid communication with the interior of hydrogen output composite 32 and with hydrogen chamber 40. Preferably, the entire membrane assembly 28 is hydrophobic. More specifically, lattices 30 and 36 are hydrophobic, as well as membranes 34.

Generally, lattices 30, 36 can be any lattice-like material and may be stiff or flexible. The lattice material may be a solid lattice, a fabric, textile, nylon knit, wick, mesh material, screen, corrugated shape, or other gas permeable structure that can serve as a base for lamination and prevent the membranes 34 from collapsing on one another. Suitable lattice materials including those positioned or inserted within a fuel bladder disclosed in co-owned U.S. Pat. No. 7,172,825, which is hereby incorporated by reference in its entirety. Hydrogen output composite 32 filters produced hydrogen gas out of the fuel mixture and convey the produced gas to hydrogen outlet 38 and to outlet valve 14. By constructing the hydrogen separator in this manner, which is also discussed in WO2010-051557 A1, instead of using a membrane enclosing a fuel mixture, higher pressures can be used within the housing, because hydrogen output composite is under compression.

While hydrophobic hydrogen output composite 32 is preferred, any suitable separators can be used with hydrogen generator 10. Other suitable hydrogen separators are disclosed in U.S. Pat. No. 7,727,293 B2, international publication no. WO2010-051557 A1 and international publication no. WO 2010/075410, among others.

The hydrogen gas is separated from a mixture of aqueous fuel mixture and reacted fuel/byproduct, when it passes through hydrogen permeable membranes 34 into the interior of hydrogen output composite 32, where the hydrogen passes through and/or along internal lattice 36 to hydrogen conduit 38 to flow out of hydrogen output composite 32. Hydrogen conduit 38 is connected to hydrogen chamber 40, and hydrogen collects in chamber 40. Outlet valve 14 is connected to hydrogen chamber 40 and is also connected to a fuel cell or other gas/hydrogen consumer (not shown). First relief valve 42 is provided to hydrogen chamber 40 to vent hydrogen when the pressure within chamber 40 is above a predetermined threshold level.

Second relief valve 44 is provided to chamber 24 to vent when the pressure in that chamber is above another predetermined threshold level. Preferably, a filler or absorbent material is provided on the outside of second relief valve 44 to absorb any aqueous fuel mixture or liquid byproduct that may vent when second relief valve 44 opens. More preferably, this filler or absorbent material is acidic to neutralize the liquid when the liquid is basic, as described below when a stabilizer such as sodium hydroxide is added. Suitable acidic filler or absorbent materials include sulfonated cation-exchange ion exchange resins that are strongly acidic such as Amberlyst® from Rohm & Haas. Other suitable acidic materials include polymer electrolyte membrane materials, such as NAFION®. Similar acidic filters are disclosed in U.S. Pat. Nos. 7,329,348 and 7,655,147, which are incorporated herein by reference in their entireties.

Buoy 26 is connected by hollow tube 46 to outside atmosphere so that atmospheric pressure can serve as the reference pressure, as best shown in FIG. 2. Preferably, tube 46 is rigid and holds buoy 26 at angle of about 45° and more preferably between about 35° and about 55°. This angle preferably allows trapped gas to move away from buoy 26 when buoy opens or closes. However, tube 46 may hold buoy 26 at any angle, including in a vertical orientation. Tube 46 preferably is connected to surface channels 48 as best shown in FIGS. 4-5, which are depressions formed on an outside surface of chamber 24. Multiple surface channels 48 ensure that tube 46 remains open to atmosphere even when the user's finger, debris or other object blocks or partially blocks tube 46. Channels 48 can be disposed on the bottom of chamber 24, as shown, or on the side of chamber 24. In a preferred embodiment, hollow tube is plugged with a plugging member prior to the first use of hydrogen generator 10.

Outlet valve 14 can be any valve capable of controlling hydrogen flow, and preferably are the valves described in international patent application publication nos. WO2009-026441 and WO2009-026439, which are incorporated herein by reference in their entireties. Preferably, outlet valve 14 comprises center post 48, which is substantially immovable relative to chamber 24, and can be fixedly mounted to the bottom of chamber 24, as best shown in FIG. 2. Seal 50, which could be an O-ring or a flat washer, surrounds center post 48 and provides a seal for hydrogen chamber 40. Retainer 52 maintains or locks seal 50 in its proper place. Other suitable outlet valves include, but are not limited to, valves disclosed in U.S. Pat. Nos. 7,537,024, 7,059,582, 7,617,842 and U.S. published patent applications nos. US2006-0174952 and US2010-0099009. These references are also incorporated herein by reference in their entireties.

To render outlet valve 14 more difficult to operate by unintentional users or to reduce the possibility of connecting hydrogen generator 10 to incompatible machineries, a matching pre-pilot blind bore 54 is provided around outlet valve 14. To open valve 14, a corresponding or mating valve should have a cylindrical member that fits around center post 48 and inside retainer 52 to open seal 50 and an annular/concentric member that fits within pre-pilot bore 46. Other mechanisms to ensure difficult operation by unintended users and/or incompatible machineries are disclosed in U.S. published patent application nos. US 2005-0074643, US2008-0145739, US2008-0233457 and US2010-0099009, which are incorporated herein by reference to their entireties.

As discussed above, starter mechanism 23 isolates the solid fuel, e.g., sodium borohydride or other fuels that react with water or alcohols to produce gas, such as hydrogen, from the liquid fuel. An advantage of separating the fuels before the first use is that pre-mixed fuel may degrade, i.e., reacted slowly with each other in the absence of catalyst(s), during storage. Suitable starter mechanisms should isolate the two fuels during storage and prior to first use.

A guard feature, such as a pull-tab 13, or other such mechanisms which provide relatively high operational resistance by challenging a user to perform two more movements. Other high operational resistance features to resist use by unintentional users are disclosed in references discussed above and previously incorporated by reference. Accordingly, the first use or operation of hydrogen-generating apparatus 10 begins after a user at least (i) removes or overcomes guard feature 13, (ii) activates an actuator, e.g., pushing lock knob 12 inward, and (iii) removes an optional plug from reference pressure vent 46 to allow atmospheric pressure to act as the reference pressure for buoy 26, as discussed in WO2010-051557 A1.

When the user pushes lock knob 12, a force is exerted on seal piston 16 to move it into chamber 24, which preferably has at least one compressible air bubble or another compressible member, such as air-filled balloons that allow compression, to allow the movement of seal piston 16, which includes cover 22. To reduce the resistance of the liquid fuel, the diameter of cover 22 can be reduced relative of the shaft of seal piston 16. Smaller cover 22 would encounter lower resistance as it is pushed into the liquid. Suitable ratio between the diameter of cover 22 to the diameter of the shaft of seal piston 16 can be from about 1.2 to about 3.0, and preferably from about 1.5 to about 2.5. As a result, the seal provided by O-ring 18 is broken. Thereafter, liquid and solid fuels are mixed to form the aqueous fuel mixture, described above. Moreover, a stabilizer such as sodium hydroxide (NaOH) exothermically reacts with water, which causes pH to increase into the basic range and can bring the pH up to about 13 or higher. Such stabilizer minimizes the chemical reaction between the solid fuel and the liquid fuel to form a gas in the absence of catalyst.

Buoy 26 as shown in FIGS. 1, 2 and 7, is connected to hollow tube 46 to allow a reference pressure, e.g., atmospheric pressure, to communicate with bellow 56. Bellow 56 is preferably an expandable member and more preferably an elastomeric member that is in an expanded state when the pressure inside chamber 24 is less than the reference pressure. In this expanded state, catalyst 58 is exposed to the aqueous fuel mixture to react to form a gas, such as hydrogen to be consume by a hydrogen consumer, such as a fuel cell. When the pressure in chamber 24 is greater than the reference pressure, i.e., when valve 14 is closed or when the rate of gas production exceeds the rate of gas consumption, bellow 56 at least partially and preferably fully collapses or contracts to isolate catalyst 58 from the aqueous fuel mixture to slow down or stop the production of gas. Buoy 26 further comprises cap 60 and cup 62, sized and dimensioned to house bellow 56 and catalyst 58. When bellow 56 expands, cap 60 separates from cup 62, and when bellows contracts, cap 60 is pulled toward cup 62 to isolate catalyst 58. The operation and structures of buoy 26 are fully described in WO2010-051557 A1.

Figure 8A:
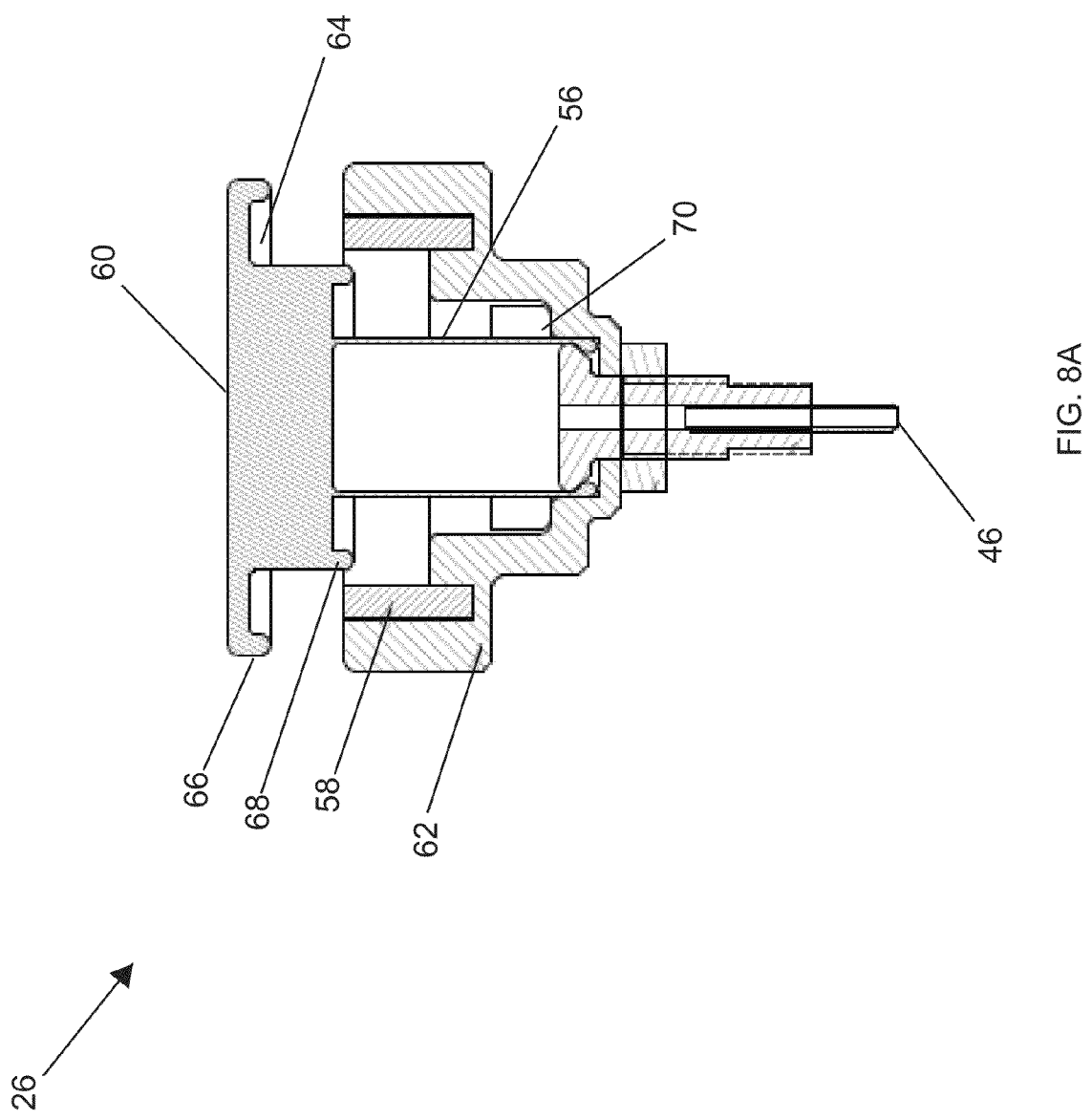
FIG. 8A is a cross-sectional view of the reactor or buoy illustrated in FIG. 7 shown in a vertical orientation.

Buoy 26 of FIG. 7 is shown upright for clarity in FIG. 8A. A preferred feature of this buoy 26 is that the volume of catalyst space is minimized to reduce the amount of fuel trapped when the buoy is closed. Furthermore, the inventors have discovered that when buoy 26 is in one orientation, i.e., relative angle between buoy 26 and chamber 24, catalyst space 64 may trap gas thereby limiting the amount of fuel available to catalyst 58, but in another orientation, catalyst space 64 may trap liquid fuel thereby making too much fuel available to catalyst 48. Hence, when catalyst spacing 64 is reduced, such variations in fuel flow rate are minimized. Cap 60 may have lips 66 and 68, as shown, that are sized and dimensioned to cover catalyst 58, when buoy 26 closes to minimize catalyst space 64. Channel(s) 70 can be provided in cup 62 and also in cap 60 to allow the aqueous fuel mixture to enter buoy 26 from the inside as well the outside to ensure that the aqueous fuel mixture is exposed to catalyst 58 as quickly as possible when buoy 26 opens, as discussed in WO2010-051557 A1.

Figure 8B:
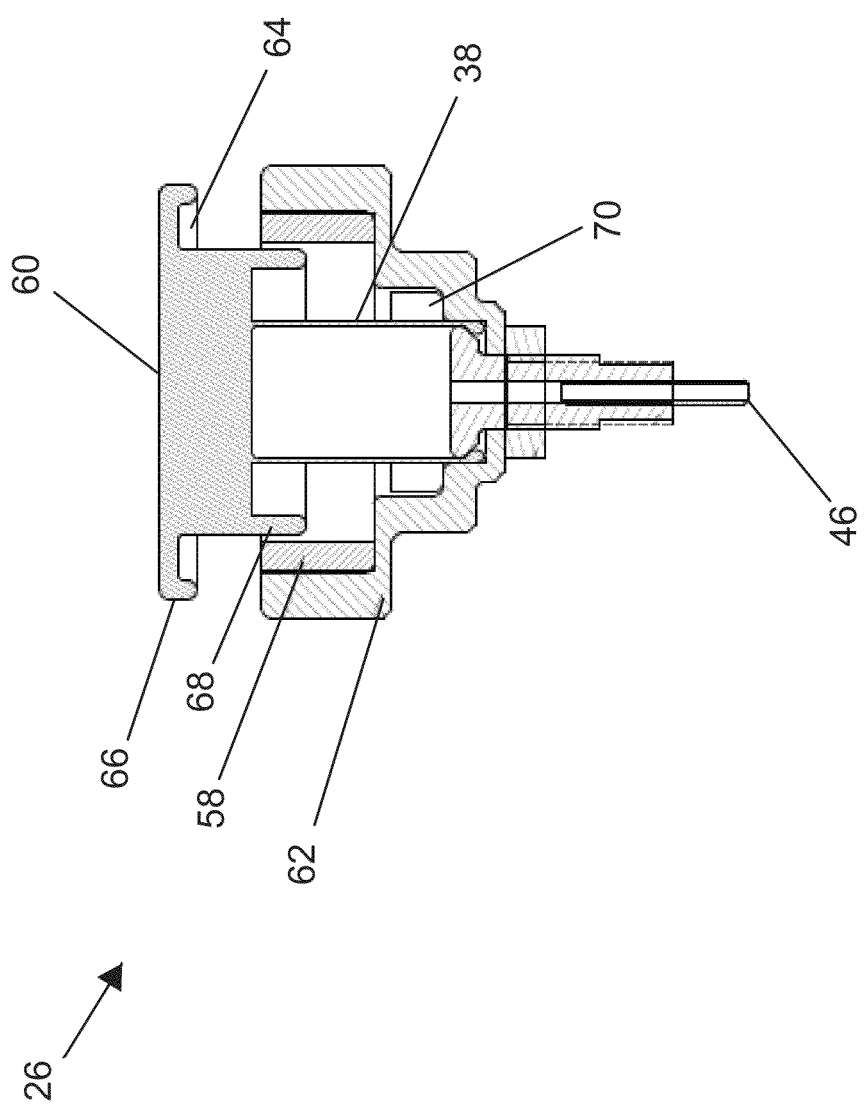
Figure 8D:
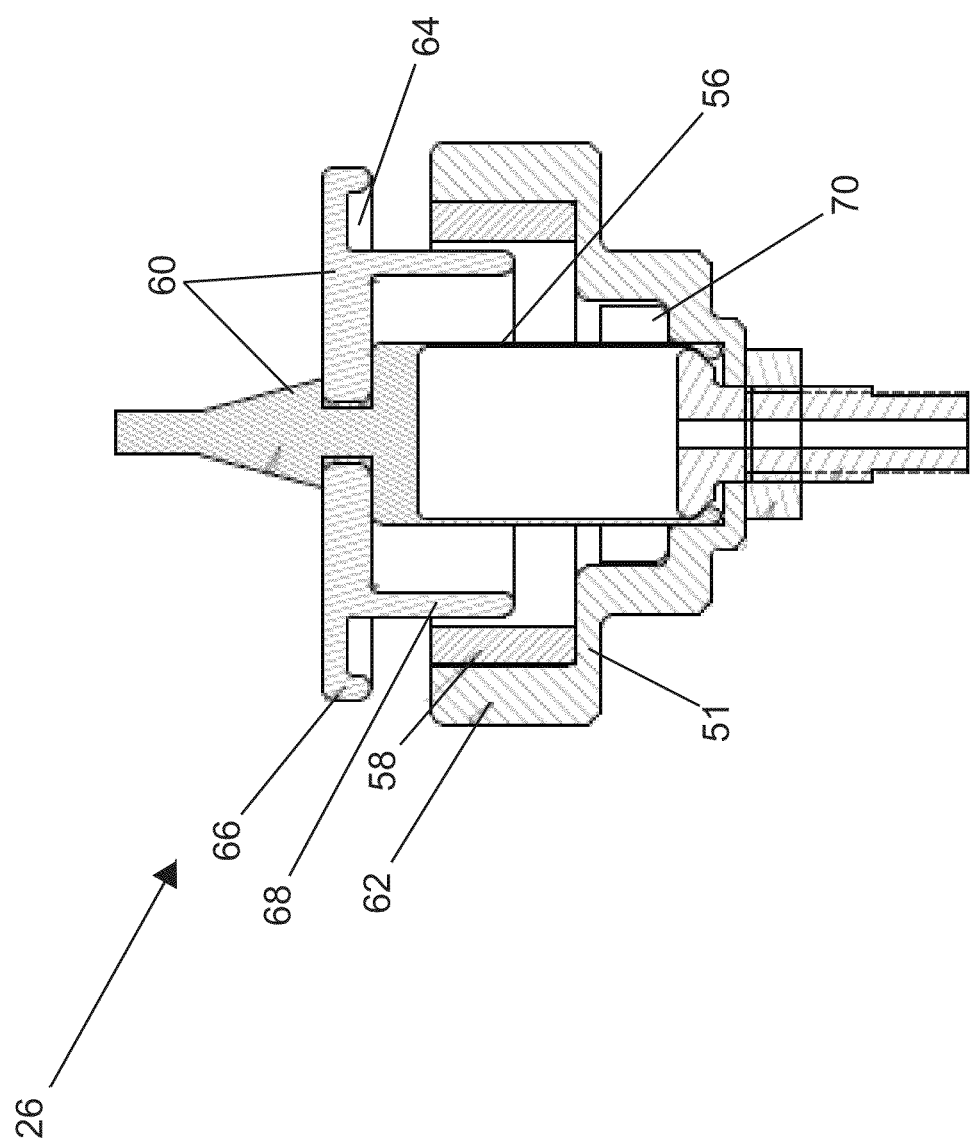

As discussed above, buoy 26 has multiple embodiments, which are also discussed in WO2010-051557 A1 previously incorporated by reference herein in its entirety. Other embodiments are described in FIGS. 8B-8I. In one example, lip 68 is extended and is positioned closer to catalyst 56, as shown in FIG. 8B. In another example, outer lip 66 is extended, as shown in FIG. 8C. In another example, cap 60 is made from two components, as shown in FIG. 8D, so that the two components can be snap-fitted together.

Figure 8E:
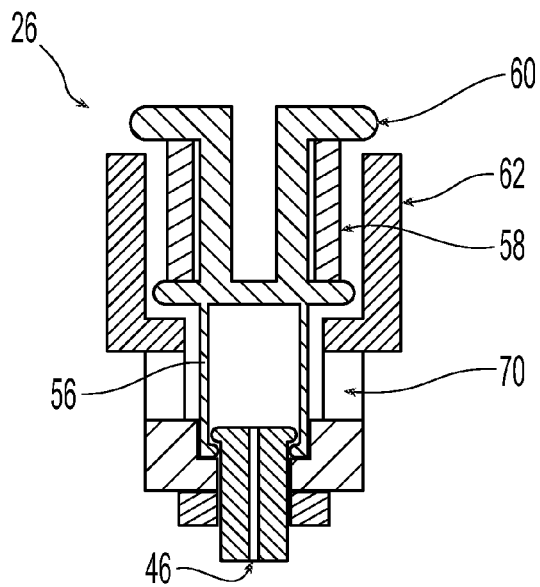
Figure 8F:
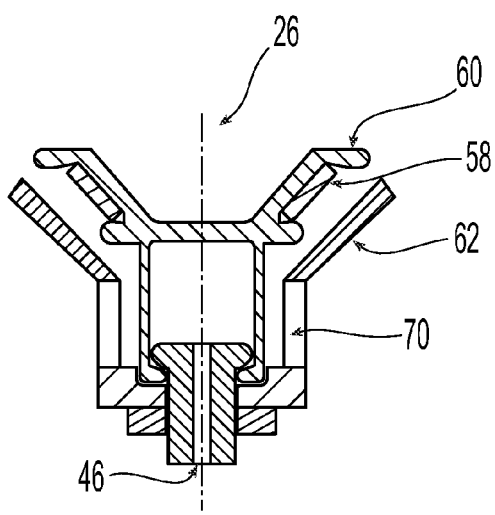
Figure 8G:
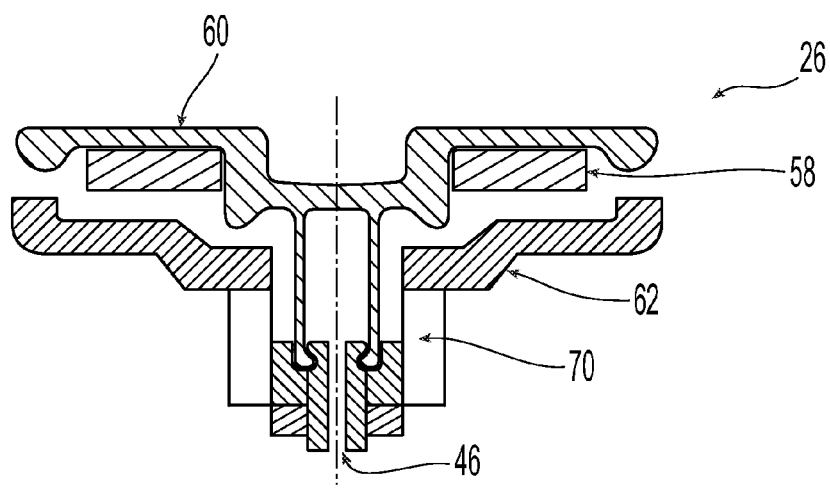

FIGS. 8E-8G show other embodiments of buoys 26, wherein catalyst 58 is carried by cap 60. As shown in FIG. 8E, catalyst 58 is positioned so that when buoy 26 opens, the aqueous fuel is introduced at both ends of the catalyst, i.e., through channel 70 and through the gap between cap 60 and cup 62. The embodiment shown in FIG. 8F is similar to that shown in FIG. 8E, except that cap 60, cup 62 and catalyst 58 of buoy 26 have a conical shape. The embodiment shown in FIG. 8G is also similar, except that catalyst 58 has a washer or flat shape.

Figure 8H:
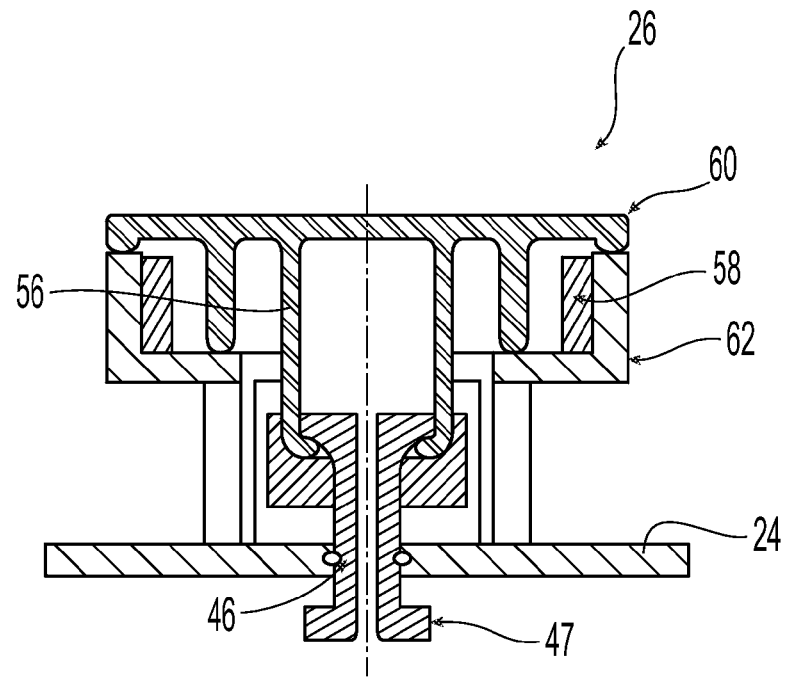
Figure 8I:
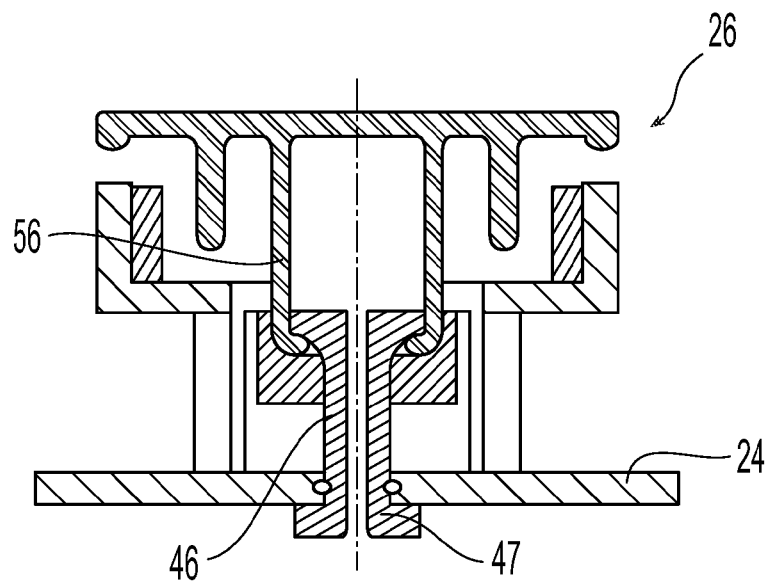

FIGS. 8H-8I illustrate a buoy that can be manually shut-off before the first use to isolate catalyst, which generally contains metal, from the liquid fuel to protect the catalyst from possible oxidation during storage and/or after the first use to ensure that no gas is generated while the buoy is closed. In this embodiment, hollow tube 46 is slidable or movable relative to the housing or chamber 24, and has actuator 47 positioned outside of chamber 24. To isolate catalyst 58, actuator 47 is pulled outward away from chamber 24, as shown in FIG. 8H. In this configuration, notwithstanding the pressure differential between the inside of bellow 56 and chamber 24, buoy 26 would not open. To activate buoy 26, actuator 47 is pushed into chamber 24, as shown in FIG. 8I, and buoy 26 functions as described above and in WO2010-051557 A1, i.e., bellow 56 is free to expand and contract in response to said pressure differential to open and close buoy 26. Other catalyst seal embodiments are described below with reference to FIGS. 9A-D, 13, 14A-B and 15A-C. The present invention is not limited to any particular configuration of buoy 26 or to any number of buoys 26 that can be deployed inside gas generator 10.

Various starting modules 23, as illustrated in FIGS. 9A-12B may be used with hydrogen-generating apparatus 10. In one embodiment, as illustrated in FIGS. 9A-9B, starting module 23 is combined with reaction buoy 26. As shown, seal piston 16 doubles as hollow tube 46 and cup 62 forms a part of seal piston 16/cover 22 and has O-ring 72 to seal the solid fuel within chamber 20 of starting module 23 during storage. Prior to the first use, lock knob 12 is pushed, as described above, which pushes buoy 26 outside of chamber 20, as shown in FIG. 9B to allow mixture of the solid fuel with the liquid fuel. The reference pressure for buoy 26 is provided through hollow piston 16, 46.

FIGS. 9C-9D illustrates another starting module 23, which is similar to the one shown in FIGS. 9A-9B, except that flow channels 74 and 76 are provided at the top and bottom of starting module 23. In this embodiment, when lock knob 12 is pushed across distance 80, both ends of chamber 20 open and allows liquid fuel to enter chamber 20 at the top and at the bottom to accelerate the mixing of the fuels. Also, as shown seal piston has a top disk and a bottom disk with seals 18 or O-ring 72 to seal the solid fuel during storage. The embodiment of FIGS. 9C-9D is similar to the embodiment of FIGS. 8H-8I in that the embodiment of FIGS. 9C-9D can also be manually shut off by pulling lock-knob outward.

In FIGS. 9C and 9D, solid fuel chamber 20 may be balanced, i.e. both the top and the bottom may have the same size opening and open the same distance. Alternatively, solid fuel chamber 20 may be unbalanced, i.e., both sides may have different sizes openings on each end and/or open different stroke distances on each end. Additionally, in this embodiment starter mechanism 23 with channels 74 and 76 can be separated from buoy 26 to function independently. In the embodiments shown in FIGS. 9A-B and 9C-D, catalyst 58 is shielded during storage.

Figure 10A:
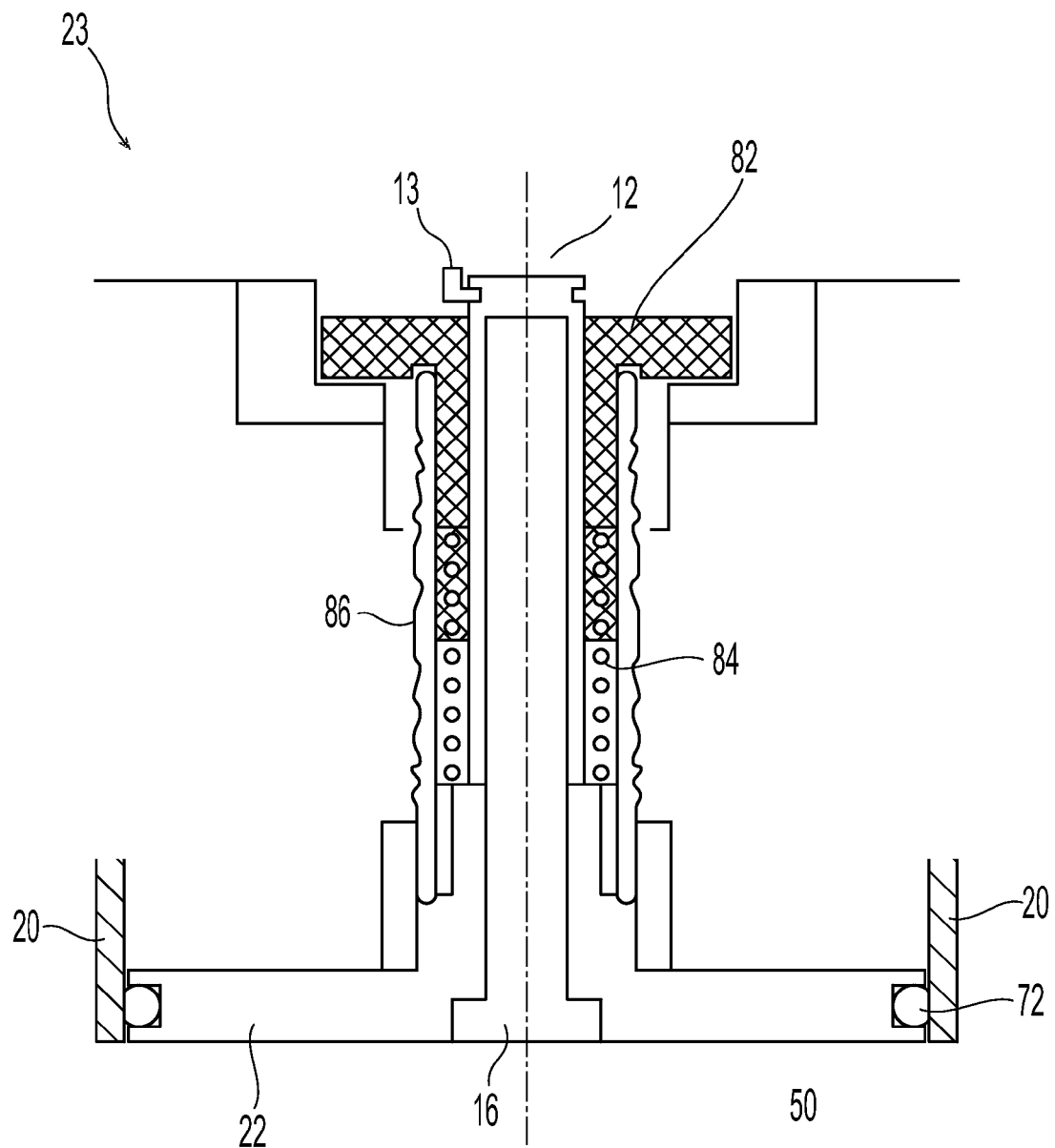
Figure 10C:
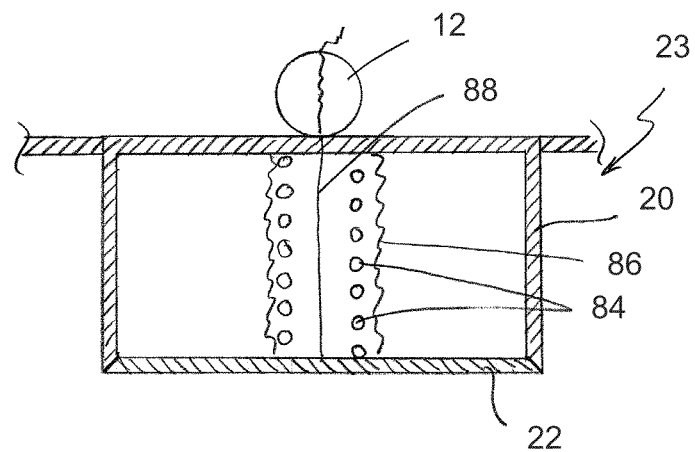

FIGS. 10A-10C illustrate another embodiment of starting module 23 that may be used with a hydrogen-generating apparatus 10. In FIG. 10A, start module 23 has actuator or lock knob 12 and operation resisting element, e.g., a pull-tab or latch 13. The shaft of seal piston 16 is surrounded by retainer 82, which is biased by spring 84 against cover 22 of seal piston 16. Retainer 82 and spring 84 are protected by flexible sleeve 86 to keep the solid fuel from interfering with the operation of retainer 82 and spring 84. Spring 84 is installed in a compressed state and is being partially retained by a frictional force between seal 18 or O-ring 72 and chamber 20. When lock-knob 12 is depressed, cover 22 of piston 16 is pushed beyond chamber 20, spring 84 is activated or releases its stored energy to push seal piston 16 and cover 22 for a distance longer than the distance that lock-knob 12 was pushed. An advantage of this embodiment that a relative short stroke of lock-knob 12 can cause a significantly longer stroke for seal piston 16 to allow liquid fuel to enter chamber 20 more rapidly.

The starter mechanism of FIG. 10B is similar to that of FIG. 10A, except that the shaft of seal piston 16 is divided into two segments 16a and 16b, so that when spring 84 is activated it pushes cover 22 and the lower shaft 16b, without having to move the upper shaft 16a and lock-knob 12 may remain flush to the outer surface of starter 23 without being pulled into the inside of starter 23.

FIG. 10C illustrates another starting module 23 comprising a frangible actuator 12 connected to cover 22 by rod or string member 88. Once frangible member or rod/string 88, i.e., another embodiment of actuator 12, is broken or detached, spring 84 is activated or released, thereby pushing cover 22 away from chamber 20, allowing the liquid fuel to enter chamber 20.

Figure 11A:
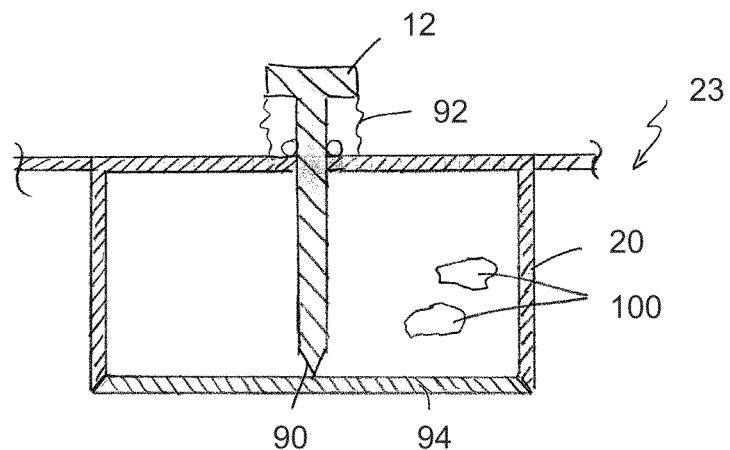
FIGS. 11A-C are cross-sectional views of starter mechanisms with a frangible member.
Figure 11B:
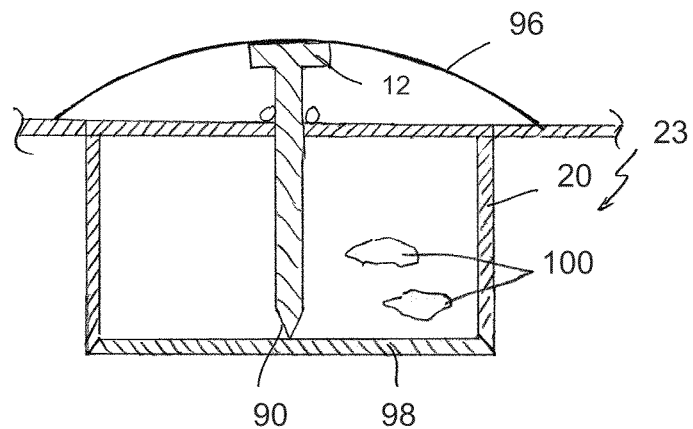
Figure 11C:
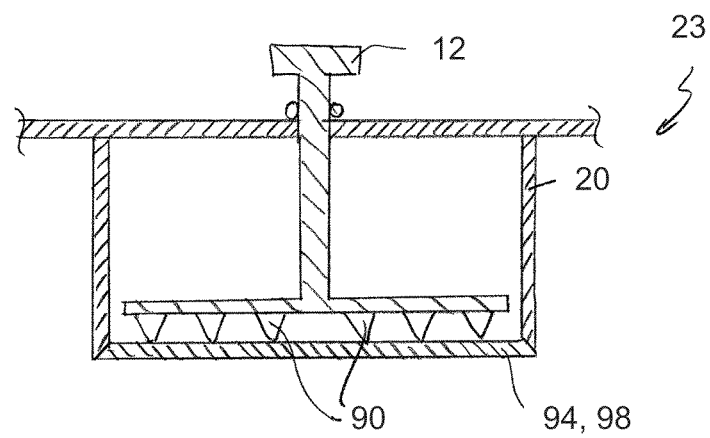
Figure 12:
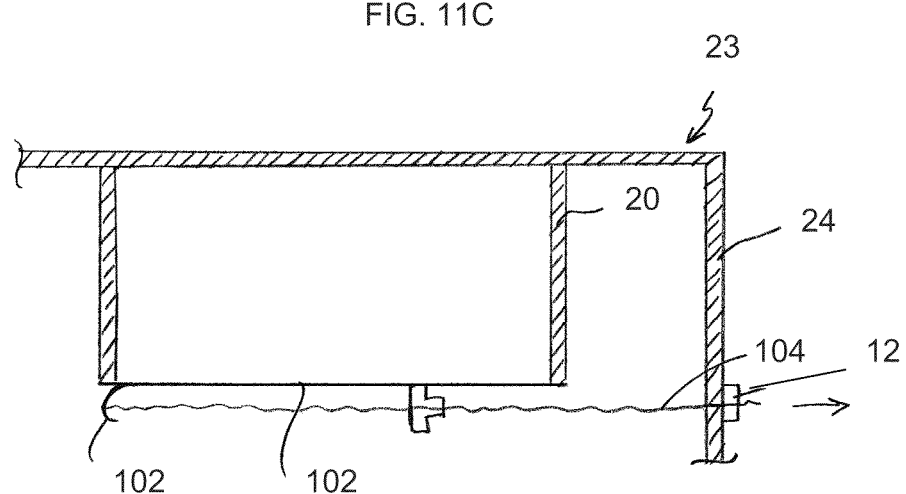
FIGS. 12A-B are cross-sectional views of starter mechanisms with a peel-able member.
Figure 12:
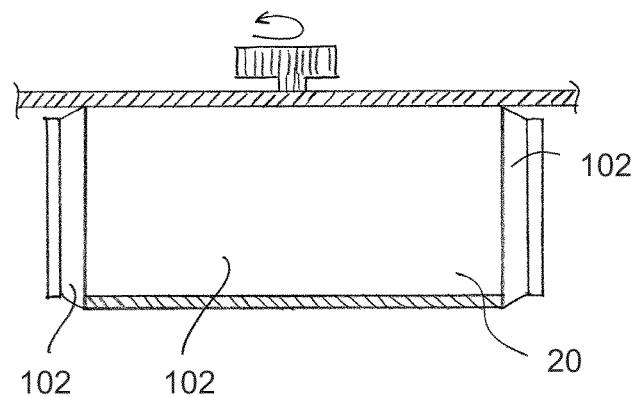

FIGS. 11A-C illustrate another embodiment of starting module 23 wherein actuator 12 comprises a sharp edge 90 such as a barb, needle, or the like. For example, in FIG. 11A, a user pushes actuator 12, which is connected to solid fuel chamber 20 by flexible sleeve 92, and this motion causes sharp edge 90 to puncture a frangible member, e.g., an' etched glass 94 that overlies solid fuel chamber 20. The puncturing of frangible member 94 causes the influx of the liquid fuel to mix with solid fuel to form the aqueous fuel mixture. Advantageously, a mesh 94 overlies frangible member to prevent broken pieces from entering chamber 24.

FIG. 11B illustrates another starting module 23 wherein a sharp edge 90 is connected to a flexible diaphragm or wall 96 that overlies solid fuel chamber 20. Once a user pushes flexible diaphragm 96, sharp edge 90 moves towards a membrane 98 separating the solid fuel from the liquid fuel and punctures it to allow the two fuels to mix.

Alternatively, solid fuel chamber 20 comprises solid fuel as well as a pressurized gas or one or more gas pockets 100. The pressurized gas creates a positive pressure, which would discourage liquid fuel from flowing into chamber 20. Suitable gases include, but are not limited to nitrogen or hydrogen or an inert gas. Other variations of starting module 23 comprising a sharp edge 90 are also contemplated. FIG. 11C illustrates starting module 23 comprising a plurality of sharp edges 90, e.g., barbs, connected to lock-knob 12, similar to the embodiment shown in FIGS. 11A-B.

FIGS. 12A-12B illustrate a starting module 23 wherein a covering foil 102 separates the solid fuel in chamber 20 from the liquid fuel. Unlike other embodiments, foil 102 is not removed by puncturing but is peeled or unwound. In FIG. 12A, foil 102 is connected to an actuator 12 comprising a nylon cord 104 or other suitable pulley that produces a mechanical advantage. Actuator 12 may be pulled to peel away foil 102 until it encounters stop plate 106. Further information about using such mechanisms or indexing mechanisms can be found in U.S. published patent application US 2008-0206113 A1, which is incorporated herein by reference in its entirety. In FIG. 12B, foil 102 is wound around a cylindrical solid fuel chamber 20. An actuator 12, such as a thumb wheel is rotated to unwind foil 102. In both FIGS. 12A and 12B, once foil 102 is removed, the liquid and solid fuels are allowed to mix.

Figure 13:
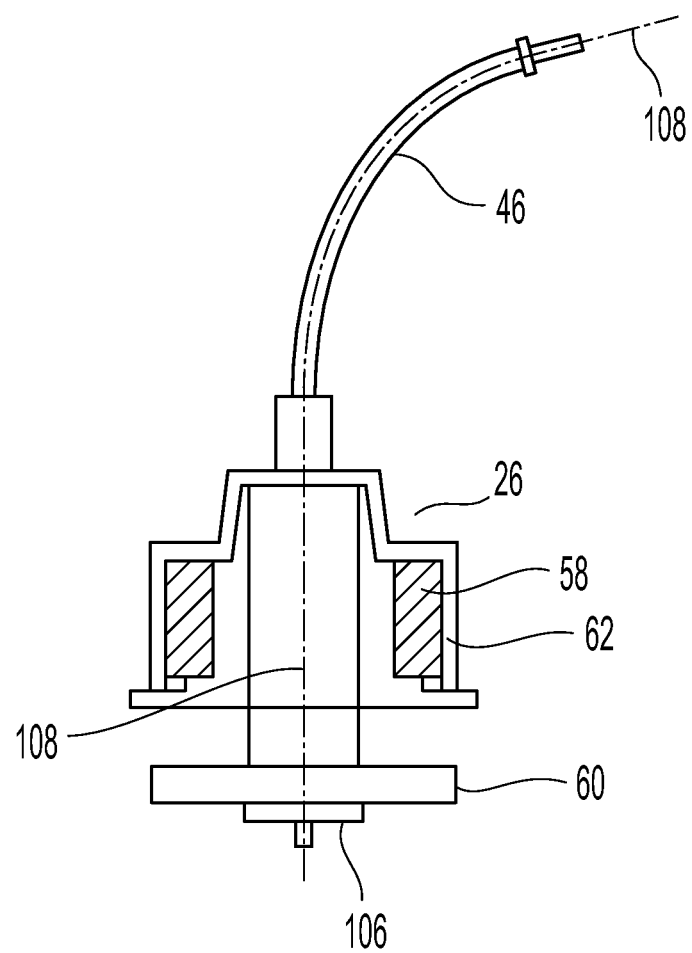
FIG. 13 is a cross-sectional view of a buoy with a catalyst shield.

Another catalyst shield is shown in FIG. 13. Anchor 106 is provided on cap 60 of buoy 26, where a flexible member such as a string or cord 108 is attached at one end and is threaded through buoy 26 and hollow tube 46 and is attached at the outer end to the outside of chamber 24. During storage or before first use, cord 108 pulls cap 60 and secures it to cup 62 to isolate catalyst 58 from the liquid fuel precursor or from the mixed aqueous fuel. Bellow 56 is compressed. The outer end of cord 108 is secured to the outside of chamber 24, e.g., by a tape or by wounding the outer end of cord 108 to a hook or anchor. Before first use, the outer end of cord 108 is released (or cut) to allow cap 60 to move away from cup 62. Similar to the embodiment shown in FIG. 8H-8I, after the first use, to ensure that no gas is produced, e.g., when is fuel cell is turn off, the outer end of cord 108 can be pulled to re-secure cap 60 to cup 62.

Figure 14B:
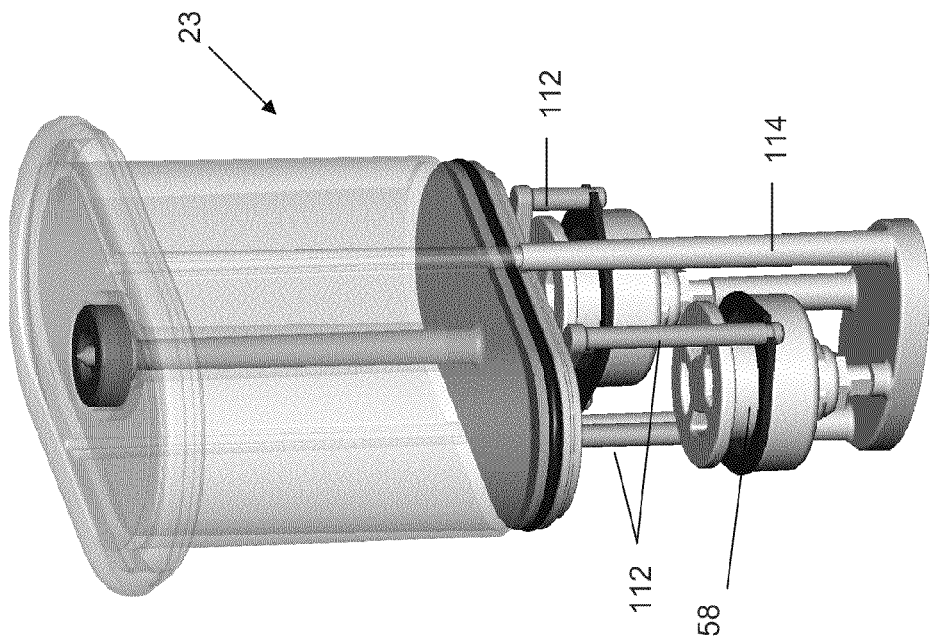
FIGS. 14A-B illustrate alternative starter mechanism including a catalyst shield.
Figure 14A:
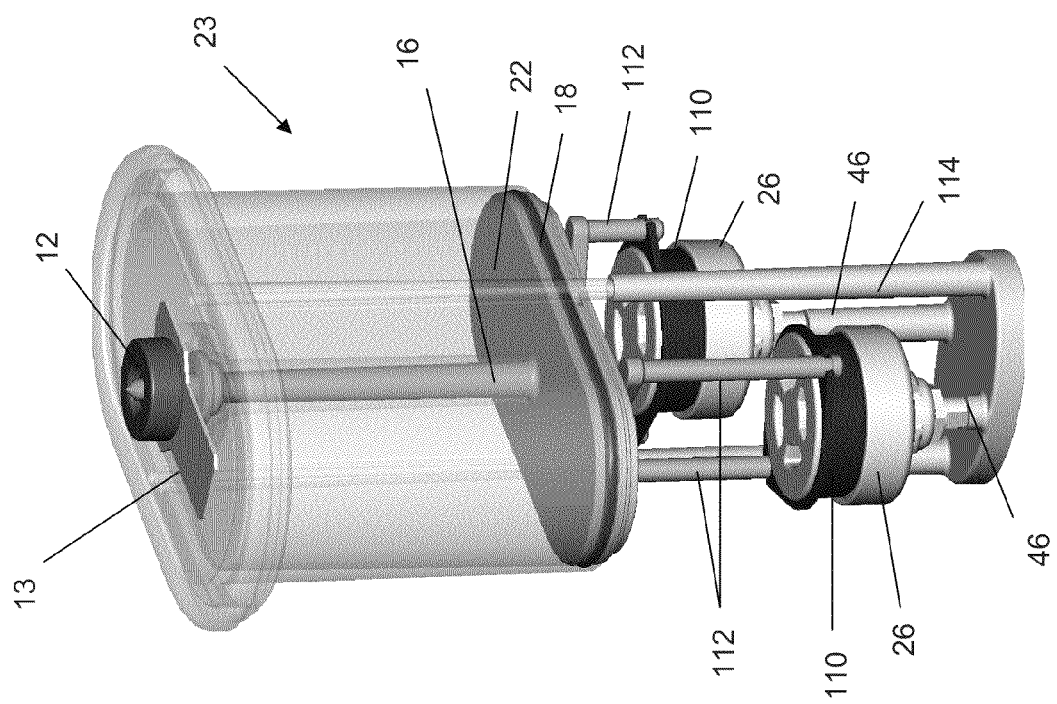

Another catalyst shield is illustrated in FIGS. 14A-14B. In this embodiment, the catalyst shield comprises shield 110 positioned around the catalyst and covering same. Shield 110 is attached to starter mechanism 23 by one or more rods 112. Prior to the first use, as shown in FIG. 14A, rods 112 are attached to cover 22 of seal piston 16 to hold shield 110 in the shielding position. As shown in FIG. 14B, after pull-tab 13 is removed, and actuator/lock-knob 12 is activated to allow the mixing of the solid and liquid fuels, the movement of seal piston 16 and cover 22 pushes rods 112 and shield 110 away from catalyst 58 to expose the catalyst to the fuel to generate gas. Optional support columns 114 can be provided to give gas-generator 10 additional structural integrity.

An advantage of the catalyst shield 110 is that it does not place expandable member/bellow 56 in compression during storage. Bellow 56 is preferably made from elastomeric or rubber materials, which are generally thermoset materials. Prolong storage in a compression mode may set the material's memory so that compressed configuration and may interfere with bellow 56's expansion and contraction during use. In a preferred embodiment, during storage bellow 56 is placed under a slight tension.

As shown in FIGS. 14A-14B, more than one reactor or buoy 26 can be used in the inventive gas inventors, as disclosed in WO 2010-051557.

Figure 15A:
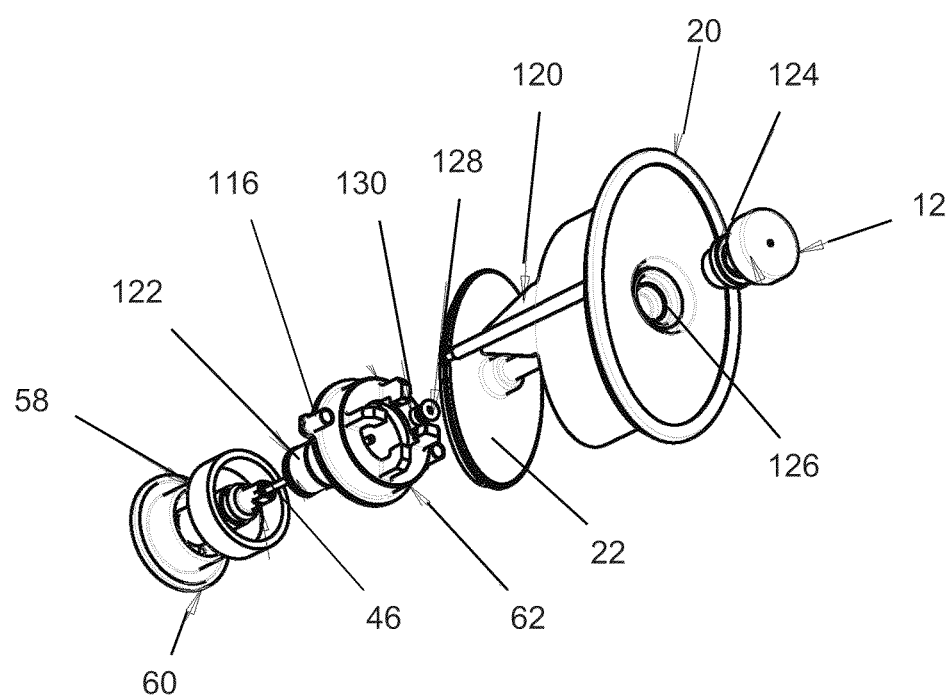
Figure 15B:
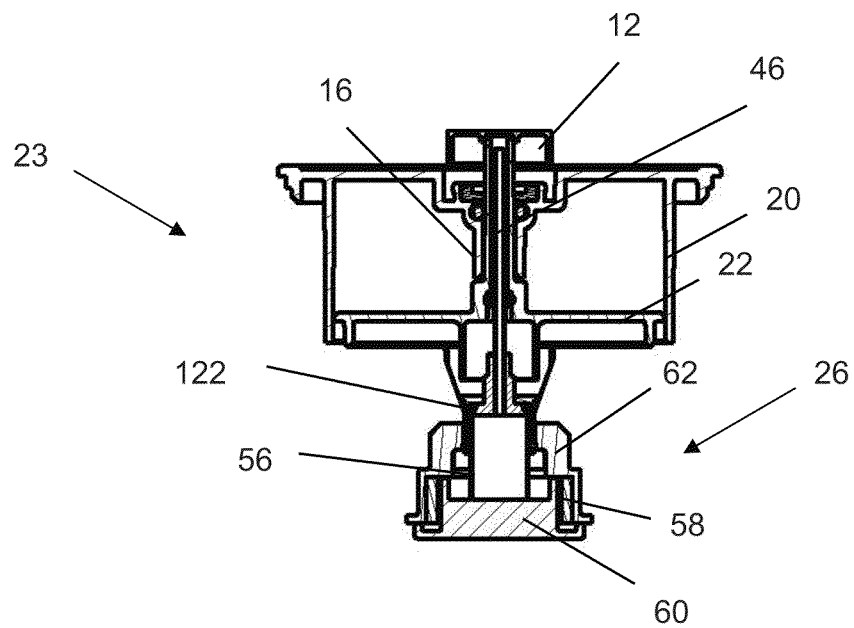
Figure 15C:
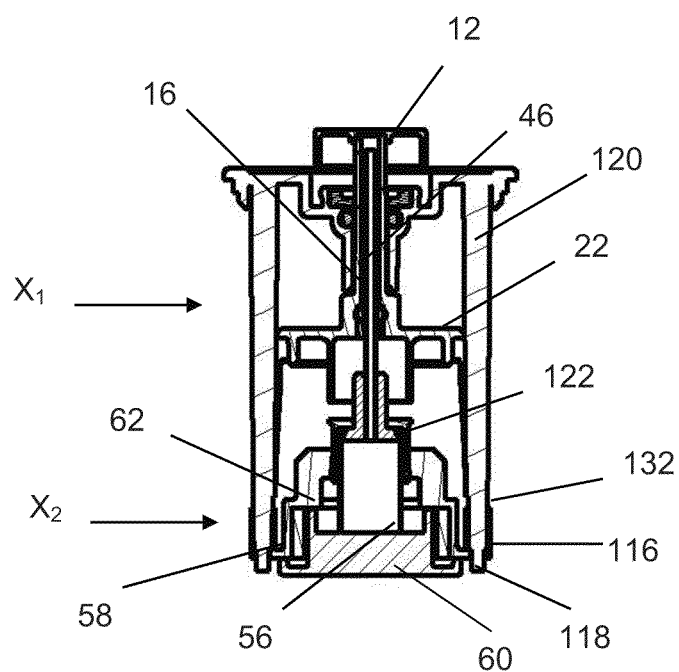

Another catalyst shield mechanism is illustrated in FIGS. 15A-C. In this embodiment, cup 62 of buoy 26 is connected to starter mechanism 23. As illustrated, cup 62 comprises receiving holes 116 which are sized and dimensioned to receive distal ends 118 of support columns 120. Similar to the embodiments described above, e.g., FIGS. 9A-D, vent tube 46 is integrated with the shaft of piston 16. In this embodiment, collar 122 is attached to bellow 56 of buoy 26 and also to vent tube 46/piston 16, such that when actuator/lock knob 12 is actuated or depressed, cap 22 of starter mechanism 23 opens and buoy 26 is released from its storage configuration. Collar 122 may be omitted when bellow 56 is directly connected to vent tube 46 or indirectly through another connecting member. Ribs 124 of lock knob 12 in this embodiment interlocks with corresponding ridges 126 to hold lock-knob 12 after activation to prevent lock knob 12 from being pulled back. O-ring 128 and retainer 130 can optionally be provided to support vent tube 46 and to seal a potential fluid path between piston 16 and vent tube 46.

In this embodiment, bellow 56 is also being stored in an un-compressed state, as best shown in FIGS. 15B-C, similar to the embodiment shown in FIGS. 14A-B. However, in this embodiment, catalyst 58 is being shielded by the interaction among lock knob 12, vent tube 46, collar 122, bellow 56 and cap 60, which are preferably held in at a slight tension, to pull cap 60 towards cup 62 to seal catalyst 58 during storage. A catalyst seal similar to catalyst seal 110 is not being deployed in this embodiment.

In certain situations for the embodiment shown in FIGS. 15A-C and similar embodiments such as the ones shown in FIGS. 9A-D, it is advantageous to have the "stroke length" of cap 22 and the "stroke length" of collar 122/bellow 56/cap 60 be different from each other. In other words, the distance $X_1$ that starter mechanism 23 opens be different than distance $X_2$ that buoy 26 may open. $X_1 \neq X_2$ may be advantageous, because $X_1$ relates to the mixing of the solid fuel and liquid fuel and to the flow pattern of the mixed fuels into and out of opened chamber 20 and $X_2$ is related to a different function, i.e., the opening and closing of buoy 26 during gas generation. This is accomplished by having distal end 118 of columns 120 being slidably received in receiving holes 116 provided on cup 62 as best shown in FIGS. 15A and 15C. Distal end 118 is enlarged at its tip (not shown) to keep cup 62 attached to columns 120, and columns 120 has shoulder 132, which is larger than the diameter of receiving holes 116. This allows cup 62 of buoy 26 limited movement between shoulder 132 and the enlarged tip of distal end 118. This limited movement represents the difference in stroke lengths $X_1$ and $X_2$.

Figure 16A:
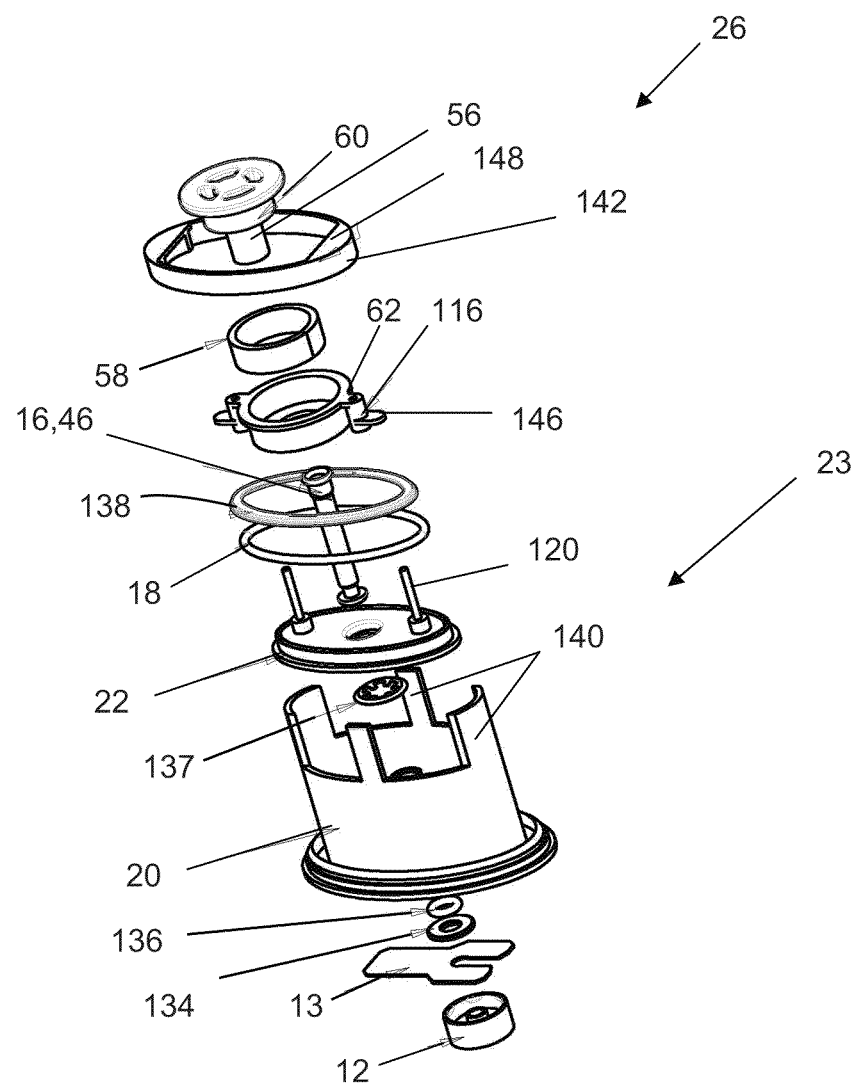
Figure 16B:
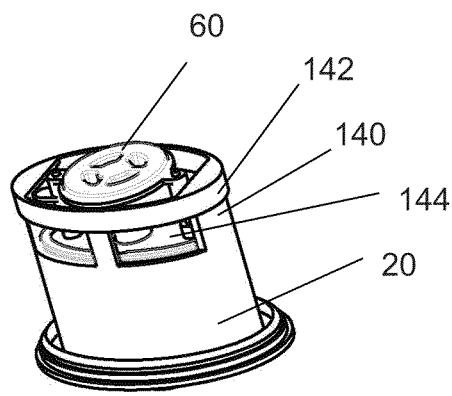
Figure 16C:
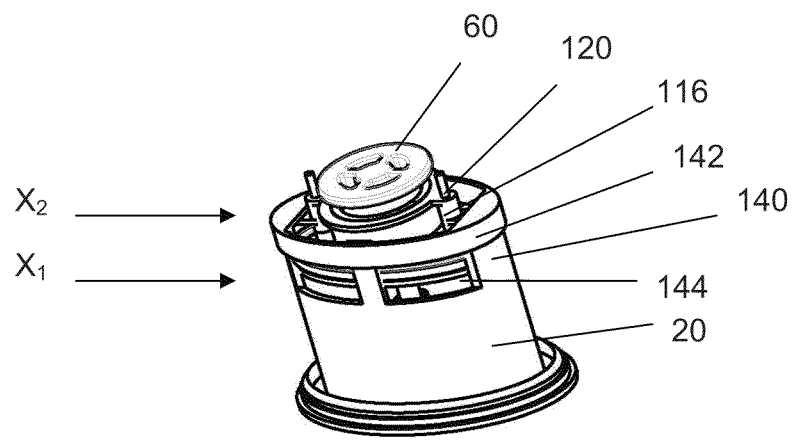
Figure 16D:
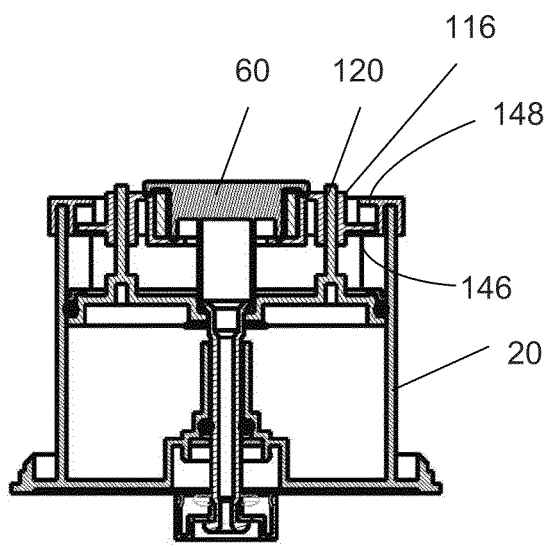

The starter and buoy combination illustrated in FIGS. 16A-E is similar to that shown in FIGS. 15A-C. As best shown in FIGS. 16A, actuator/lock-knob 12 cooperates with pull-tab 13 and has O-ring 134 and retainer 136 to prevent liquid from leaving starter 23 through the lock-knob, similar to the embodiment shown in FIG. 1, among others. Vent tube 46 and the shaft of piston 16 are integrated, as shown, and shaft/tube 16/46 is connected at the proximal end to actuator 12 and at the distal end to cover 22 and to bellow 56. Retainer 137, which in this embodiment is preferably a star-shaped washer, retains shaft/tube 16/46 to cover 22. Similar to the embodiments discussed above, O-ring 18 is provided to seal cover 22 to chamber 20 during storage. Retainer 138 keeps O-ring 18 in its proper position. Solid fuel chamber 20 in this embodiment have a plurality of upstanding posts 140 that extend above chamber 20 and collar 142 connect or attach to the ends of posts 140, as best shown in FIGS. 16B-D. Spaces 144 are defined between posts 140 and collar 142 to form flow channels or openings to allow liquid fuel to enter solid fuel chamber 20 after actuation to mix.

Figure 16E:
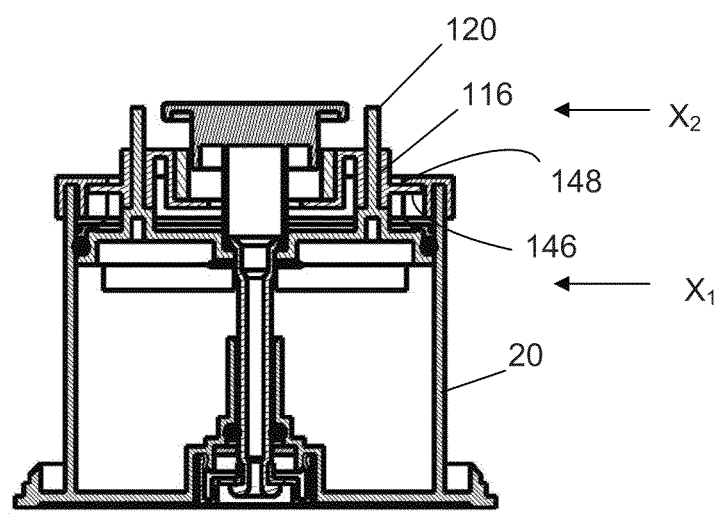

Similar to the embodiment of FIGS. 15A-C, stroke lengths $X_1$ and $X_2$ are preferably different from each other, as best shown in FIGS. 16C and 16E. Columns 120 are attached to cover 22 and are adapted to be slidingly received within receiving holes 116 on cup 62 of buoy 26, as best shown in FIGS. 16D-E. To maintain the sliding connection or attachment between cup 62/buoy 26 and starter mechanism 23, stops 146 are provide on cup 62 (or on buoy 26). Ledges 148 on collar 142 cooperate with stops 146 by interfering with the movement of stops 146 to maintain this sliding connection.

In another embodiment, catalyst 58 can be a part of bellow 56, cap 60 and/or cup 62, e.g., catalyst materials can be molded into one or more of these parts. Additionally, starter mechanisms 23 can store the liquid fuel, while chamber 24 stores the solid fuel. Furthermore, one or both fuels may be solid, liquid, gel or slurry. The present invention is mot limited to the state of any fuel components.

In according with another aspect of the present invention, the chamber that holds the solid fuel, e.g., chamber 20 in starter mechanism 23, is put under a partial vacuum so that when starter mechanism is activated and the solid fuel chamber is opened, the liquid fuel is sucked into the solid fuel chamber to enhance the mixing of the two fuels. This feature is usable with any of the embodiments of the starter mechanisms described herein.

The present application further incorporates by reference in its entirety commonly owned patent application entitled "Hydrogen Membrane Separator" having docket number BIC-136 and filed on even date herewith.

One of ordinary skill in the art will appreciate that the gas generators of the present invention may be used to generate gases other than oxygen by using different fuels and the present invention is not limited to any particular fuels. The various embodiments disclosed herein and components thereof can be used interchangeably with each other. Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

We claim:
1. A gas-generating apparatus comprising:
   a first compartment containing a first fuel and a second compartment containing a second fuel, wherein the first and second fuel are mixed to form a fuel mixture, said fuel mixture reacts to produce a gas in the presence of a catalyst; and
   wherein the first compartment comprises a cover connected to an actuator located on the outside of the gas-generating apparatus, wherein the actuator is selectively actuatable to mix the first and second fuels,
   wherein a hollow shaft connects the actuator to a reactor within the gas-generator and is in fluid communication with a reference pressure and with an expandable member of the reactor, expandable member within the reactor, wherein the reactor houses the catalyst; wherein the cover is connected to the actuator by the shaft; and wherein when the actuator is actuated the cover moves away from the first compartment to open the first compartment.

2. The gas-generating apparatus of claim 1, wherein the reactor opens or closes depending on a pressure difference between the reference pressure and an internal pressure of the gas-generating apparatus.

3. The gas-generating apparatus of claim 2, wherein the reactor comprises a cup and a cap connected by the expandable member.

4. The gas-generating apparatus of claim 1, wherein the actuator is movable by a user.

5. The gas-generating apparatus of claim 1 further comprising a hydrophobic gas separator.

6. The gas-generating apparatus of claim 5, wherein the hydrophobic gas separator is under compression to separate the gas.

7. A gas-generating apparatus comprising:
a first compartment containing a first fuel and a second compartment containing a second fuel, wherein the first and second fuel are mixed to form a fuel mixture, said fuel mixture reacts to produce a gas in the presence of a catalyst; and
wherein the first compartment comprises a cover connected to an actuator located on the outside of the gas-generating apparatus, wherein the actuator is selectively actuatable to mix the first and second fuels,
wherein the cover is connected to the actuator by a flexible connector; and wherein when the actuator is actuated the cover moves away from the first compartment to open the first compartment.

8. The gas-generating apparatus of claim 7, wherein the cover is connected to the actuator by a chord or a string.

9. The gas-generating apparatus of claim 7, wherein the flexible connector is under tension.

10. The gas-generating apparatus of claim 9, wherein the flexible member is released to actuate.

11. The gas-generating apparatus of claim 10, wherein the flexible member is severed.

12. A gas-generating apparatus comprising:
a first compartment containing a first fuel and a second compartment containing a second fuel, wherein the first and second fuel are mixed to form a fuel mixture, said fuel mixture reacts to produce a gas in the presence of a catalyst; and
wherein the first compartment comprises a cover connected to an actuator located on the outside of the gas-generating apparatus, wherein the actuator is selectively actuatable to mix the first and second fuels
wherein the second compartment comprises a reactor which contains the catalyst, wherein a hollow tube fluidly connects an expandable member of the reactor with a reference pressure source; and wherein when the actuator is actuated the cover moves away from the first compartment to open the first compartment.

13. The gas-generating apparatus of claim 12, wherein the reactor opens or closes depending on a pressure difference between a pressure within the expandable member and an internal pressure of the gas-generating apparatus.

14. The gas-generating apparatus of claim 13, wherein the hollow tube is connected to at least one surface channel defined on an outer surface of the gas-generating apparatus.

15. The gas-generating apparatus of claim 12, wherein the cover is frangible.

16. The gas-generating apparatus of claim 12, wherein the cover is peelable.

17. A gas-generating apparatus comprising:
a first compartment containing a first fuel and a second compartment containing a second fuel, wherein the first and second fuel are mixed to form a fuel mixture, said fuel mixture reacts to produce a gas in the presence of a catalyst; and
wherein the first compartment comprises a cover connected to an actuator located on the outside of the gas-generating apparatus, wherein the actuator is selectively actuatable to mix the first and second fuels
wherein a catalyst shield covers the catalyst, wherein the catalyst shield is movable away from the catalyst when the actuator is actuated; and wherein when the actuator is actuated the cover moves away from the first compartment to open the first compartment.

18. The gas-generating apparatus of claim 17, wherein the catalyst shield is connected to the cover.

19. A gas-generating apparatus comprising:
a first compartment containing a first fuel and a second compartment containing a second fuel, wherein the first and second fuel are mixed to form a fuel mixture, said fuel mixture reacts to produce a gas in the presence of a catalyst; and
wherein the first compartment comprises a cover connected to an actuator located on the outside of the gas-generating apparatus, wherein the actuator is selectively actuatable to mix the first and second fuels,
wherein the first fuel compartment is at least under a partial vacuum before the actuator is actuated; and wherein when the actuator is actuated the cover moves away from the first compartment to open the first compartment.

* * * * *